United States Patent
Ly et al.

(10) Patent No.: US 10,009,707 B2
(45) Date of Patent: Jun. 26, 2018

(54) INTERWORKING LIGHT WEIGHT MACHINE-TO-MACHINE PROTOCOL WITH DEVICE MANAGEMENT PROTOCOL

(71) Applicant: Convida Wireless, LLC, Wilmington, DE (US)

(72) Inventors: Quang Ly, North Wales, PA (US); Chonggang Wang, Princeton, NJ (US); Dale N. Seed, Allentown, PA (US); Shamim Akbar Rahman, Cote St. Luc (CA); Xu Li, Plainsboro, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 2 days.

(21) Appl. No.: 15/327,818

(22) PCT Filed: Jul. 22, 2015

(86) PCT No.: PCT/US2015/041524
§ 371 (c)(1),
(2) Date: Jan. 20, 2017

(87) PCT Pub. No.: WO2016/014662
PCT Pub. Date: Jan. 28, 2016

(65) Prior Publication Data
US 2017/0215023 A1 Jul. 27, 2017

Related U.S. Application Data

(60) Provisional application No. 62/027,395, filed on Jul. 22, 2014.

(51) Int. Cl.
| | |
|---|---|
| *H04W 4/00* | (2018.01) |
| *H04W 60/00* | (2009.01) |
| *H04L 29/12* | (2006.01) |
| *H04L 29/08* | (2006.01) |
| *H04W 88/16* | (2009.01) |

(52) U.S. Cl.
CPC .......... *H04W 4/001* (2013.01); *H04W 4/005* (2013.01); *H04W 60/005* (2013.01);
(Continued)

(58) Field of Classification Search
CPC ... H04W 4/001; H04W 4/005; H04W 60/005; H04W 88/16
See application file for complete search history.

(56) References Cited

U.S. PATENT DOCUMENTS 7,269,602 B2 * 9/2007 Kaappa ............. G06F 17/30938
8,688,741 B2 * 4/2014 Chen ..................... H04L 41/082
707/792
(Continued)

FOREIGN PATENT DOCUMENTS

WO WO 2012-109531 A2 8/2012

OTHER PUBLICATIONS

International Patent Application No. PCT/US2015/041524: International Preliminary Report on Patentability dated Feb. 2, 2017, 13 pages.
(Continued)

*Primary Examiner* — Sonny Trinh
(74) *Attorney, Agent, or Firm* — Baker & Hostetler, LLP

(57) ABSTRACT

Interworking LWM2M and OMA DM protocols is disclosed. A new DDF MO enables adding LWM2M object definitions to DM Servers and Gateways. This MO allows a DM Server/Gateway to accept newly defined MOs, such as LWM2M Object definitions. New procedures are defined for registering DDF documents to the newly created DDF MO. A new registration interface is added in the GwMO protocol to allow an LWM2M Server to register end devices to a DM gateway. A protocol translation mechanism bridges the gap between non-RESTful to RESTful protocols, such as OMA DM and/or GwMO to LWM2M.

12 Claims, 25 Drawing Sheets

(52) U.S. Cl.
CPC ........ *H04L 61/1582* (2013.01); *H04L 67/303* (2013.01); *H04W 88/16* (2013.01)

(56) References Cited

U.S. PATENT DOCUMENTS

| | | | |
|---|---|---|---|
| 9,445,302 B2* | 9/2016 | Vos | H04W 28/0268 |
| 9,565,172 B2* | 2/2017 | Stahl | G06F 21/33 |
| 9,615,346 B2* | 4/2017 | Kim | H04L 41/082 |
| 9,635,057 B2* | 4/2017 | Bone | H04L 63/062 |
| 2011/0145294 A1 | 6/2011 | Chen et al. | |
| 2017/0048336 A1* | 2/2017 | Novo Diaz | H04L 67/16 |

OTHER PUBLICATIONS

Open Mobile Alliance (OMA) DM List of Supported Management Object (ListMO) Approved Version 1.0, OMA-ER-ListMO-V1_0-20130212-A, Feb. 12, 2013, 18 pages.

Open Mobile Alliance (OMA) "Gateway Management Object Technical Specification", Approved Version 1.0, OMA-TS-GwMO-V1_0-20130618-A, Jun. 18, 2013, 9 pages.

Open Mobile Alliance (OMA) "Lightweight Machine to Machine Architecture", Candidate Version 1.0, OMA-AD-LightweightM2M-V1_0-20131210-C, Dec. 10, 2013, 12 pages.

Open Mobile Alliance (OMA) "OMA Device Management Notification Initiated Session", Approved Version 1.2.1, OMA-TS-DM_Notification-V1_2_1-20080617-A, Jun. 17, 2008, 16 pages.

Open Mobile Alliance (OMA) "OMA Device Management Representation Protocol", Approved Version 1.2.1, Jun. 17, 2008, 47 pages.

Open Mobile Alliance (OMA) "OMA Device Management Tree and Description", Approved Version 1.2.1, OMA-TS-DM_TND-V1_2_1-20080617-A, Jun. 17, 2008, 48 pages.

Shelby et al, "Constrained Application Protocol (CoAP) draft-ietf-core-coap-18", CoRE Working Group, Internet-Draft, Jun. 28, 2013, 118 pages.

* cited by examiner

```
<MgmtTree>
  <Node>
      <NodeName>Vendor</NodeName>
      <DFProperties>...</DFProperties>
      <Node>
          <NodeName>ISP</NodeName>
          <DFProperties>...</DFProperties>
          <Node>
              <NodeName>GWInfo</NodeName>
              <DFProperties>...</DFProperties>
              <Node>
                 <NodeName>GWName</NodeName>
                 <DFProperties>...</DFProperties>
                 <Value>gw.yyy.se</Value>
              </Node>
          </Node>
      </Node>
  </Node>
</MgmtTree>
```

FIG. 3

```
<Alert>
  <CmdID>3</CmdID>
  <Data>1227</Data>        <!-- New Register DDF Alert Code -->
  <Item>
    <Target><LocURI>./DDFMO/SCOMO/1.0/DdfFile</LocURI></Target>
    <Meta>
      <Type xmlns="syncml:metinf">
        urn:oma:at:oma-ddfmo:registerddf:1.0
      </Type>
      <Format xmlns="syncml:metinf">xml</Format>
    </Meta>
    <Data>
<![CDATA[
  (DDF XML)...
- ]]>
    </Data>
  </Item>
</Alert>
```

FIG. 10A

```
<Alert>
  <CmdID>3</CmdID>
  <Data>1227</Data>        <!-- New Register DDF Alert Code -->
  <Item>
    <Target><LocURI>./DDFMO/SCOMO/1.0/DdfUri</LocURI></Target>
    <Meta>
      <Type xmlns="syncml:metinf">
        urn:oma:at:oma-ddfmo:registerddf:1.0
      </Type>
      <Format xmlns="syncml:metinf">xml</Format>
    </Meta>
    <Data>
<![CDATA[
 http://www.example.com/ddffiles/scomo.ddf
- ]]>
    </Data>
  </Item>
</Alert>
```

FIG. 10B

```
<Register>
<CmdID>2</CmdID>
<Add>
<CmdID>3</CmdID>
<Item>
<Target><LocURI>./GwMO/<x>/Inventory/Records</LocURI></Target>
<Data>32</Data>
</Item>
</Add>
<Add>
<CmdID>4</CmdID>
<Item>
<Target><LocURI>./GwMO/<x>/Inventory/Records/32/DevType</LocURI></Target>
<Data>M2M Device</Data>
</Item>
</Add>
<Add>
<CmdID>5</CmdID>
<Item>
<Target><LocURI>./GwMO/<x>/Inventory/Records/32/Mode</LocURI></Target>
<Data>4</Data>
</Item>
</Add>
</Register>
```

FIG. 13A

```
<Register>
  <CmdID>2</CmdID>
  <Delete>
    <CmdID>3</CmdID>
    <Item>
      <Target><LocURI>./GwMO/<x>/Inventory/Records</LocURI></Target>
      <Data>32</Data>
    </Item>
  <Delete>
</Register>
```

*FIG. 13B*

```
<Sequence>
  <CmdID>1234</CmdID>
  <Add>
    <CmdID>1235</CmdID>
    ... command details ...
  </Add>
  <Add>
    <CmdID>1236</CmdID>
    ... command details ...
  </Add>
  <Delete>
    <CmdID>1237</CmdID>
    ... command details ...
  </Delete>
</Sequence>
```

*FIG. 14*

INTERWORKING LIGHT WEIGHT MACHINE-TO-MACHINE PROTOCOL WITH DEVICE MANAGEMENT PROTOCOL

CROSS REFERENCE TO RELATED APPLICATIONS

This application is a National Stage Application filed under 35 U.S.C. 371 of International Application No. PCT/US2015/041524, filed Jul. 22, 2015, which claims the benefit of Provisional U.S. Patent Application No. 62/027,395, filed on Jul. 22, 2014, the disclosure of which is hereby incorporated by reference as set forth in its entirety herein.

BACKGROUND

The Open Mobile Alliance (OMA) has developed a number of protocols for device management in a network, including the OMA Device Management (DM) protocol, the OMA Gateway Managed Object (GwMO) protocol, and the OMA Lightweight Machine-to-Machine (LWM2M) protocol. The OMA DM protocol may be used to manage standalone devices, such as mobile devices, in a network. The OMA GwMO protocol may be used for managing end devices behind a gateway, and the OMA LWM2M may be used for managing constrained machine-to-machine (M2M) or Internet-of-Things (IoT) devices.

The general architecture of the OMA DM protocol is shown in FIG. 1. A DM Server 102 (sometimes also referred to as a Management Server) is the master entity that sends commands to DM Clients running on devices or gateways (such as device or gateway 104) to manage them. The DM Client is an entity that runs on devices or gateways to provide communications with the DM Server 102. It is also referred to as a Management Client. A DM Session is an OMA DM protocol management session created between a DM Server and a DM Client. DM commands are sent within this session between the two entities.

The commands operate on nodes that are logically grouped together into Managed Objects (MOs) on the devices. An MO is a collection of DM nodes that collectively provide some management operation such as software download (SCOMO) or device information (DevInfo MO). The MOs are organized into a hierarchical tree structure called the DM Tree or Management Tree, shown at 106 in FIG. 1. An example DM Tree is illustrated in FIG. 2.

A DM node is a single element within a Managed Object or DM Tree. It can be an interior node or a leaf node. Interior nodes have child nodes; leaf nodes do not have child nodes and will contain some value or can be operated on by Execute commands.

In the OMA DM protocol, each MO is described by the OMA Device Description Framework (DDF). This DDF is an Extensible Markup Language (XML) document that is read by the DM Server to fully describe all the nodes contained within the Managed Object, and it describes what actions can be performed on each node. Elements found in the DDF are the node names, node properties, and values associated with the leaf nodes. The node properties include Description Framework Properties (DFProperties). These DFProperties contain meta-data about each node. DFProperties are properties defined during the specification of the MO and examples include AccessType, DefaultValue, Description, DFFormat, Occurrence, Scope, DFTitle, DFType, and CaseSense. In addition, Run Time Properties (RTProperties) are generated at run time and include properties such as Access Control List (ACL), Format, Name, Size, Title, Timestamp, Type, and Version Number.

FIG. 3 shows a simple example of a DDF document. Note that the details of the DFProperties have been purposely left out for brevity. In this example, the DDF describes an interior node with a URI "Vendor/ISP/GWInfo" and has a child node named "GWName", which contains the value "gw.yyy.se". "Vendor", "ISP", and "GWInfo" are names of interior nodes while "GWName" is the name of a leaf node. The DDF files show the format of the management object and the possible values that each node can take. The client and/or server are responsible for assigning values to each node. The DDF files are provisioned to the DM Server and DM Client to enable end to end support of the corresponding MO. Typically, this is done out of band from the normal operations of the DM Protocol.

FIG. 4 illustrates the architecture of the GwMO protocol. The GwMO protocol defines an intermediate OMA DM Gateway 402 that helps expand device management functionalities to end devices that are not directly reachable by a DM Server 406. End devices, such as end devices 404a, 404b, and 404c, communicate to the OMA DM Gateway 402, which then alerts the DM Server 406 of the new end devices. Device management commands are sent from the DM Server 406 to the OMA DM Gateway 402, which then distributes the commands to the end devices according to one of several different modes of operation. Three modes are defined: Transparent, Proxy, and Adaptation modes. In both Transparent and Proxy modes, the end devices understand native OMA DM commands while Adaptation mode requires translation from OMA DM Protocol to a non-OMA DM protocol.

Central to the operation of the OMA DM Gateway 402 is a GwMO Component (not shown). This entity provides five MOs to manage end devices behind a gateway: Device Inventory, Gateway Config, Fanout, Image Inventory, and End Device Trigger. The functionality of these MOs reuses the same message formats as the OMA DM Protocol, so it is designed to function seamlessly with an OMA DM system. The definition of the GwMO component allows OMA to extend its reach to support non-OMA DM devices, some of which may be more constrained than existing OMA DM devices.

The LWM2M protocol was developed to address the growing popularity of M2M communication networks as a means for managing M2M devices in such networks. LWM2M is based on the same client-server architecture as OMA DM, but uses a different communication protocol with a simpler and flatter resource tree that is more applicable to constrained devices, such as those found in M2M communication networks. In particular, LWM2M uses the Constrained Application Protocol (CoAP) and its resource tree is defined as Objects with underlying resources organized in a flat structure with fewer levels of hierarchies. The definition of Objects and resources in LWM2M is analogous to that of MOs and nodes in the OMA DM Protocol. FIG. 5 illustrates the LWM2M architecture. As shown, an LWM2M Server 502 is the master entity in the OMA LWM2M protocol. It communicates to LWM2M Clients (e.g., LWM2M Client 504) to provide device management and information reporting capabilities. LWM2M Clients run on constrained devices, such as M2M Device 506 within M2M or IoT systems that provide device management and information reporting capabilities to LWM2M Servers.

In addition to supporting device management, the LWM2M Protocol also supports service enablement provided by the constrained devices. Since a constrained device mostly provides data measurements for its particular application, information reporting is one of the main service enablements specified in the protocol. As such, the design of the Objects focuses on providing resources that will support device management and information reporting.

SUMMARY

Embodiments disclosed herein provide enhancements to the existing OMA DM and GwMO protocols that provide added functionality while also making it possible to interwork with LWM2M. According to one aspect of the present application, a new DDF MO is created to enable adding LWM2M object definitions to DM Servers and Gateways. This MO allows a DM Server/Gateway to accept newly defined MOs, such as LWM2M Object definitions. In another aspect, new procedures are defined for registering DDF documents to the newly created DDF MO. Another aspect involves adding a new registration interface in the GwMO protocol to allow an LWM2M Server to register end devices to a DM gateway. Yet another aspect introduces protocol translation mechanisms to bridge the gap between non-RESTful to RESTful protocols, such as OMA DM and/or GwMO to LWM2M.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the Detailed Description below, given by way of example, in conjunction with the accompanying drawings wherein like numerals indicate like elements throughout. In the drawings:

FIG. 3 shows a simple example of an OMA DM DDF document.

FIG. 10A shows one example of a Register DDF Alert message in which a DDF file is embedded in the message.

FIG. 10B shows another example of a Register DDF Alert message in which the location of the DDF file is specified by a URI

FIG. 13A shows one example of a Device Registration message.

FIG. 13B shows one example of a De-registration message.

FIG. 14 shows an example of a Sequence command that contains two Add and one Delete commands.

DETAILED DESCRIPTION

Figure 1:
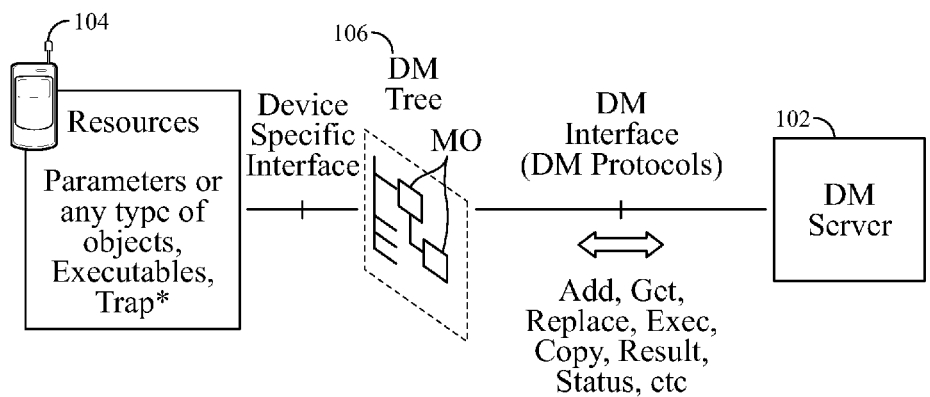
FIG. 1 is a block diagram illustrating the general architecture of the OMA DM protocol.
Figure 2:
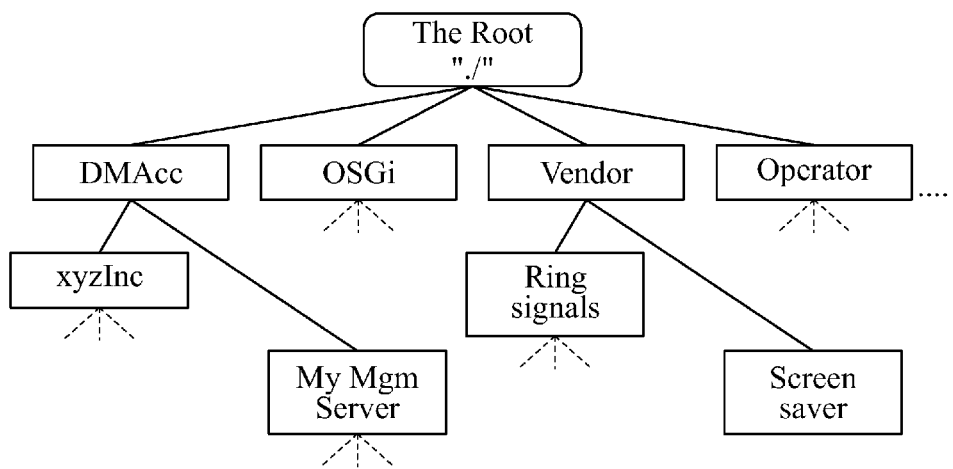
FIG. 2 shows an example of an OMA DM protocol DM Tree.
Figure 4:
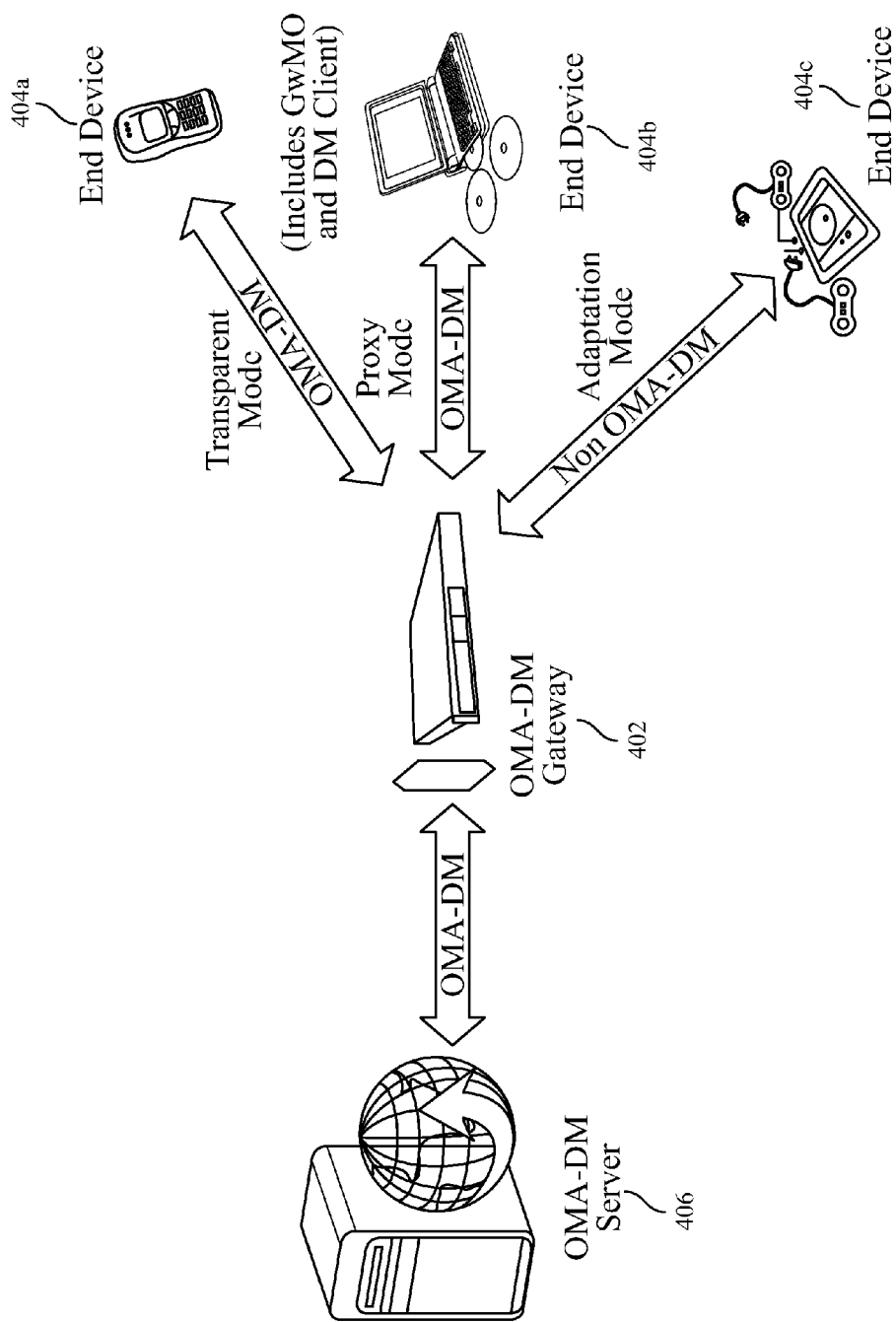
FIG. 4 illustrates the architecture of the OMA GwMO protocol.
Figure 5:
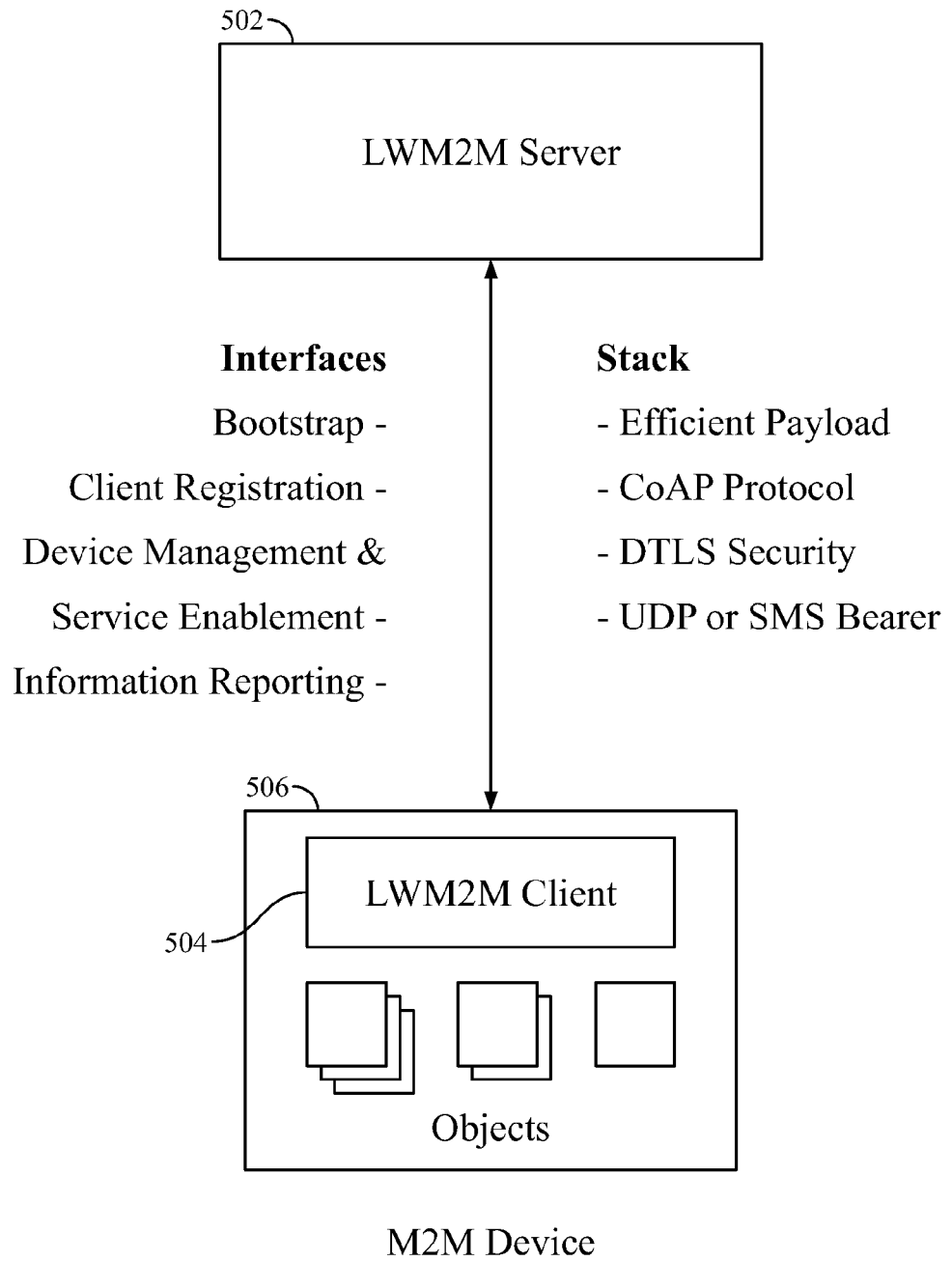
FIG. 5 illustrates the architecture of the OMA LWM2M protocol.

The development of the OMA protocols described above reflects a progressive evolution as OMA addressed emerging technologies. The OMA LWM2M protocol attempts to provide management of more constrained devices in line with the growing interest in M2M, IoT, and Web of Things (WoT) devices.

The LWM2M Protocol is different from that of the preceding OMA DM and GwMO protocols. It uses a communication protocol that is more conducive for constrained devices with a flatter and simpler resource tree. The data types are simplified and the payloads are more efficient. As a result, the LWM2M protocol presently is not compatible with that of OMA DM and GwMO.

Furthermore, the OMA DM protocol lacks mechanisms to dynamically support the addition of new device MOs. A DDF document completely defines all nodes and their associated functionality within a MO and is used by DM Servers, DM Gateways and DM Clients to build their respective management trees. If a client includes an MO for which the DM server has no DDF file, then the DM server is not able to recognize the MO. The omission of such a mechanism prevents the ability to add LWM2M Object definitions to OMA DM and makes interworking LWM2M to OMA DM more difficult.

In addition, OMA GwMO protocol lacks a capability for devices to dynamically register to the DM Gateway. GwMO has a Device Inventory MO to keep track of devices it manages behind a gateway, but it does not define an interface that devices can use to register to it. An M2M/IoT device cannot be added in a plug and play manner—it needs to be provisioned within the GwMO first. In a deployment scenario in which end users are installing devices to communicate to the gateway, the lack of a plug and play feature is not desirable.

Finally, protocol translation mechanisms are necessary to bridge the gap between OMA DM and OMA LWM2M protocols. These protocols have vastly different messaging requirements and were designed for different market segments. The command structure and use are different and the underlying transport layer protocol is also different. These differences require some well defined translation mechanisms to make the systems interoperate as seamless as possible.

Addressing the deficiencies noted above, the present application discloses interworking mechanisms that allow OMA LWM2M systems to interoperate with OMA DM and GwMO systems.

According to a first aspect disclosed herein, a new Device Description Framework (DDF) Managed Object (MO) is defined to allow the DM Server and DM Gateway to recognize LWM2M Objects. This MO will allow the DM Server/Gateway to accept newly defined MOs such as the LWM2M Object definitions.

According to a second aspect disclosed herein, new DDF registration procedures are defined to support dynamically adding or updating of newly defined DDFs. Once an LWM2M Object is converted to DDF format, the resulting document can then be registered to either a DM Server or DM Gateway. This feature allows for DM Servers and DM Gateways to recognize the LWM2M Objects as DM MOs.

According to a third aspect disclosed herein, a new GwMO registration procedure is defined to allow a device to register itself to a DM Gateway through an LWM2M Server. The new registration process extends the LWM2M device "register" operation to register the device to the DM Gateway. After the LWM2M Server has completed the "register" operation, it sends the information it has about the device to the DM Gateway as part of the new registration procedure. The DM Gateway in turn updates the Device Inventory MO with information about the device. This feature allows M2M/IoT devices to dynamically "plug and play" into an OMA DM system.

According to a fourth aspect disclosed herein, protocol translation mechanisms are defined to support interworking LWM2M to OMA DM protocol. OMA DM is not a RESTful protocol while LWM2M is RESTful—some translations are required to interwork LWM2M to DM. In addition, some DM commands require state information to be kept in order to process the command—these commands need to be translated to RESTful commands and state information is kept by an interworking function to aid in the translation.

Figure 6:
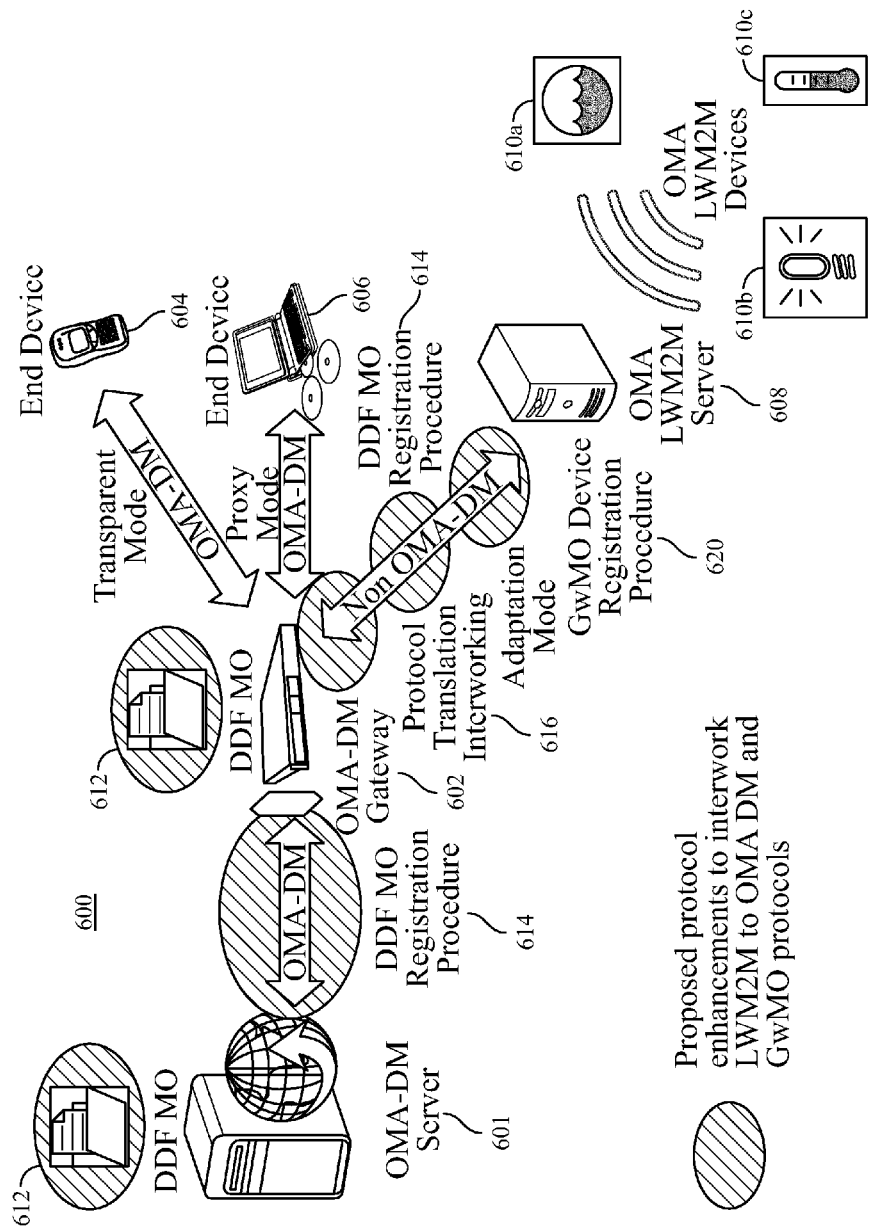
FIG. 6 is a block diagram of one embodiment of an OMA GwMO architecture with an overlay of an LWM2M system and with the various aspects of the present application also illustrated, in accordance with one embodiment.

FIG. 6 is a block diagram of one embodiment of an OMA GwMO architecture with an overlay of an LWM2M system and with the various aspects of the present application also illustrated. As shown, in this embodiment, an OMA DM Server 601 communicates with an OMA DM Gateway 602. The OMA DM Gateway 602 may communicate with some end devices (e.g., mobile device 604) via its transparent mode, and with other end devices (e.g., computer 606) via its proxy mode. In addition, the OMA DM Gateway 602 may communicate with an OMA LWM2M Server 608 via its adaptation mode. The LWM2M Server 608 communicates with and manages a number of typically constrained devices, such as M2M devices 610a, 610b, and 610c.

FIG. 6 further illustrates how the mechanisms and procedures described herein may be overlaid on the illustrated architecture. For example, the newly defined DDF MO 612 may be stored in both the OMA DM Server 601 and OMA DM Gateway 602. Aspects of the DDF MO registration procedure 614 described herein may be performed between the OMA DM Server 601 and OMA DM Gateway 602, as well as between the OMA DM Gateway 602 and OMA LWM2M Server 608. The protocol translation function/entity 616 and GwMO device registration procedure 620 may be performed between the OMA LWM2M Server 608 and OMA-DM Gateway 602.

In various embodiments, the LWM2M Server 608 and the DM Gateway 602 can be co-located or they can be located separately. The protocol translation function/entity 616 can be a separate entity or it can be part of either the DM Gateway 602 or the LWM2M Server 608.

A benefit of the mechanisms and procedures described herein is that they further the convergence of device management operations with M2M service layer architectures. Currently, architectures such as ETSI M2M and oneM2M already specify OMA DM as a means for performing device management. However, management of M2M/IoT devices within current OMA DM and GwMO protocols is not fully specified. With the introduction of the LWM2M protocol and the mechanisms and procedures presented in this disclosure, the management of M2M/IoT can be fully realized with a service layer architecture. Deployments can then take advantage of these enhancements, for example, where the DM Server 601 is a part of an M2M Server and a DM Gateway 602 is a part of the M2M Gateway.

An end device, such as end devices 604, 606, or 610a-c, may comprise any wireless device capable of communicating in a wireless network, such as an M2M or MTC device, including for example, machines, sensors, appliances, or the like, a mobile station, a fixed or mobile subscriber unit, a pager, a personal digital assistant (PDA), a computer, a mobile phone or smart phone, or any other type of device capable of operating in a wired or wireless environment. An example architecture of an end device is described below in connection with FIG. 19C. In the present application, the end devices, such as end devices 604, 606, and 610a-c, may also be referred to as OMA DM clients.

In one embodiment, the OMA DM Server 601, OMA DM Gateway 602, Protocol Translator 616 and OMA LWM2M Server 608 are logical entities (e.g., software) that may be embodied in the form of computer-executable instructions stored in the memory of a computing system or server and executed by a processor of that computing system or server. An example computing system or server on which these logical entities may be implemented is described below in connection with FIG. 19D. In other embodiments, these entities may be implemented entirely in hardware or in any combination of hardware and software. Although the various network entities illustrated in FIG. 6, such as the OMA DM Server 601, OMA DM Gateway 602, Protocol Translator 616 and OMA LWM2M Server 608 are illustrated as separate computer systems or servers in the figure, it is understood that any two or more of them could be embodied as separate logical entities in a single computing system or server.

Moreover, it is understood that the functionality in the OMA DM Server 601, OMA DM Gateway 602, and OMA LWM2M Server 608 that implements or performs the DDF MO Registration Procedure 614, Protocol Translation Function 616, and GwMO Device Registration Procedure 620 described herein may also be implemented in the form of computer-executable instructions (e.g., software) executing on a processor of one of the respective servers 601, 602, or 608 or another computer system or server (not shown), or any other combination of hardware and software.

Device Description Framework Managed Object (DDF MO)

In the OMA DM protocol, the OMA Device Description Framework (DDF) defines all the nodes, their associated properties, and their values within a manage object. Also in the OMA DM protocol, the DM Server, DM Gateways, and DM Clients may use information in the DDF to construct their respective versions of the OMA DM Management Tree. Typically, the DDF documents are provided to these entities out of band, and this provisioning occurs prior to actual operations. Disclosed herein is a mechanism for a device with a newly defined DDF to inform a DM Server and upload its DDF document without interrupting the DM Server's operations.

Specifically, a new DDF MO 612 is disclosed herein for use in a DM Server (e.g., DM Server 601) and also in a DM Gateway (e.g., DM Gateway 602). It is understood that any discussion below of the use of the new DDF MO in a DM Server is equally applicable to use in a DM Gateway, and vice versa.

In the present embodiment, the newly defined DDF MO 612 may reside in the same DM Tree as other MOs and will hold copies of the DDFs of all MOs supported by the DM Server. In various embodiments, MOs can be registered to the DM Server either within an interface in the DM Server, through a web services API interface, or through a new DDF registration procedure executed by a DM Client—all of which methods are further described below.

Figure 7:
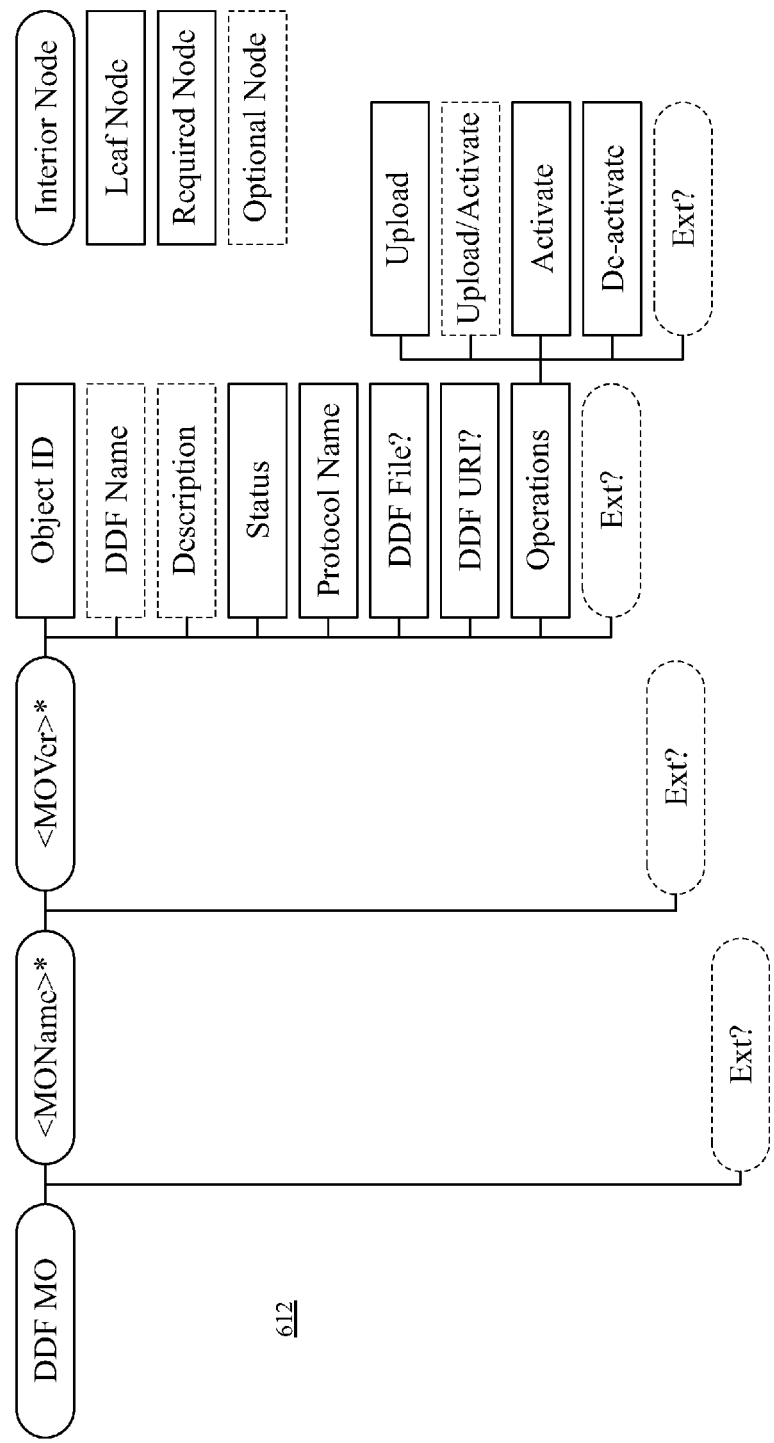
FIG. 7 is a diagram illustrating the nodes of a new DDF MO, in accordance with one embodiment thereof.

One embodiment of a structure for the new DDF MO 612 is shown in FIG. 7. In this embodiment, the structure allows for a DM Server to support multiple versions of an MO. Also in this embodiment, the DDF MO can be pre-provisioned to the DM Server to build the DDF MO's structure in the DM Server's version of the DM Tree upon startup. In one embodiment, the DDF MO can reside at the root node of the DM Tree, however, in other embodiments it may reside at another location as desired.

The description for each node of the DDF MO of FIG. 7 is described below, using OMA DM terminology. All URIs listed are relative to the ./DDFMO URI, i.e., the base URI for the DDF MO. In the description below, "Status" indicates whether the node is required or optional, "Tree Occurrence" indicates how many instances of the node may appear in the DDF MO, "Format" indicates the data format for the node, and "Access Type" indicate the operations that may be performed on the node, such as Get, Add, Copy, and Delete.

URI: ./<MoName>

This placeholder node contains the name of the MO whose DDF is referenced in child nodes. Examples include SCOMO, FUMO, DevInfo, etc.

| Status | Tree Occurrence | Format | Access Type |
|---|---|---|---|
| Required | Zero or more | Node | Get, Add, Copy, Delete |

URI: ./<MoName>/<MoVer>

This placeholder node contains the version of the MO whose DDF is referenced in child nodes. The presence of this node allows for a DM Server to support different versions of the same MO, e.g. versions 1.0 and 1.1.

| Status | Tree Occurrence | Format | Access Type |
|---|---|---|---|
| Required | One or more | Node | Get, Add, Copy, Delete |

URI: ./<MoName>/<MoVer>/ObjectID

This leaf node contains an Object ID the DM Server can use for identifying the MO. Preferably, it is a uniquely specified ID within the DM Tree.

| Status | Tree Occurrence | Format | Access Type |
|---|---|---|---|
| Required | One | Int/Chr | Get, Add, Replace |

URI: ./<MoName>/<MoVer>/DdfName

This leaf node contains the name of the DDF.

| Status | Tree Occurrence | Format | Access Type |
|---|---|---|---|
| Optional | Zero or One | Chr | Get, Add, Replace |

URI: ./<MoName>/<MoVer>/Description

This leaf node contains a description of the MO version referenced in the ancestor nodes.

| Status | Tree Occurrence | Format | Access Type |
|---|---|---|---|
| Optional | Zero or One | Chr | Get, Add, Replace |

URI: ./<MoName>/<MoVer>/Status

This leaf node contains the status of the node's operation. When the ancestor node (<MoVersion>) is created, the DM Server automatically sets this node to the default value (0). Then, the DM Server will set this node appropriately depending on the operations performed by a client. In one embodiment, the allowable values are:

- 0—No DDF present (default): This is the default state that specifies there is no DDF present.
- 1—Uploaded: This state specifies the DDF has been uploaded to the DM Server/Gateway.
- 2—Activated: This state specifies that the MO is available for use—the DM Server/Gateway has validated the uploaded DDF is properly formatted.
- 3—Error: If the DDF document is malformed, the DM Server sets the Status field to Error to indicate that the DDF cannot be process.
- 4—DeActivated: This state specifies a previously activated MO is now deactivated. When in this state, no new MO can be created but existing MO can be present. This state is used to upgrade to newer versions of an MO while preserving functionality of older versions.

| Status | Tree Occurrence | Format | Access Type |
|---|---|---|---|
| Required | One | Int/Chr | Get, No Replace |

URI: ./<MoName>/<MoVer>/ProtocolName

This leaf node contains the protocol name of the underlying DDF and is used by the DM Server/Gateway to determine which GwMO mode to use. The allowable values are:

- 0—OMA DM (default)
- 1—OMA LW2MW

| Status | Tree Occurrence | Format | Access Type |
|---|---|---|---|
| Required | One | Int/Chr | Get, Add, Replace |

URI: ./<MoName>/<MoVer>/DdfFile

This leaf node contains the actual file of the DDF that is stored locally in the DM Server. This node is mutually exclusive with that of the ./<MoName>/<MoVersion>/DdfUri node. Only one should be active at a time.

| Status | Tree Occurrence | Format | Access Type |
|---|---|---|---|
| Required | Zero or One | null | Get, Add, Replace |

URI: ./<MoName>/<MoVer>/DdfUri

This leaf node contains a URI of where the DDF file is stored.

| Status | Tree Occurrence | Format | Access Type |
|---|---|---|---|
| Required | Zero or One | chr | Get, Add, Replace |

URI: ./<MoName>/<MoVer>/Operations

This interior node is the parent node for all actions that is supported by the DDF MO.

| Status | Tree Occurrence | Format | Access Type |
|---|---|---|---|
| Required | One | node | Get, No Replace |

URI: ./<MoName>/<MoVer>/Operations/Upload

This leaf node is the target node for the Execute command to upload a DDF file. The Status is set to Upload by the DM Server once the execute command completes.

| Status | Tree Occurrence | Format | Access Type |
|---|---|---|---|
| Required | One | null | Get, Execute |

URI: ./<MoName>/<MoVer>/Operations/UploadActivate

This optionally leaf node is the target node for the Execute command to upload a DDF file and activate its operations once the upload is complete. The Status is set to Activate by the DM Server once the execute command completes.

| Status | Tree Occurrence | Format | Access Type |
|---|---|---|---|
| Optional | One | null | Get, Execute |

URI: ./<MoName>/<MoVer>/Operations/Activate

This leaf node is the target node for the Execute command to activate the referenced DDF after it has already been uploaded. The Status is set to Activate by the DM Server once the execute command completes.

| Status | Tree Occurrence | Format | Access Type |
|---|---|---|---|
| Required | One | null | Get, Execute |

URI: ./<MoName>/<MoVer>/Operations/DeActivate

This leaf node is the target node for the Execute command to deactivate the referenced MO after it has been put in operation. When the MO is deactivated, the DM Server will not allow the creation of new MO based on the DDF but will allow existing MO to operate. This feature is use for upgrading MO versions while keeping compatibility with older versions. The Status is set to DeActivate by the DM Server once the execute command completes.

| Status | Tree Occurrence | Format | Access Type |
|---|---|---|---|
| Required | One | null | Get, Execute |

URI: ./<MoName>/<MoVer>/Operations/Ext

This interior node provides for vendor specific or future OMA DM extensions to the DDF MO.

| Status | Tree Occurrence | Format | Access Type |
|---|---|---|---|
| Optional | Zero or One | node | Get |

URI: ./<MoName>/<MoVer>/Ext

This interior node provides for vendor specific or future OMA DM extensions to the DDF MO.

| Status | Tree Occurrence | Format | Access Type |
|---|---|---|---|
| Optional | Zero or One | node | Get |

URI: ./<MoName>/Ext

This interior node provides for vendor specific or future OMA DM extensions to the DDF MO.

| Status | Tree Occurrence | Format | Access Type |
|---|---|---|---|
| Optional | Zero or One | node | Get |

URI: ./Ext

This interior node provides for vendor specific or future OMA DM extensions to the DDF MO.

| Status | Tree Occurrence | Format | Access Type |
|---|---|---|---|
| Optional | Zero or One | node | Get |

DDF MO Registration Procedure 614

In accordance with one embodiment, once a DM Server is running and the nodes of the DDF MO described above have been created, a new MO can be added or an existing MO updated dynamically by registering its DDF file to the DM Server. Multiple embodiments for registering the DDF of a new MO are described herein.

In a first embodiment, the DDF of a new MO or a DDF for an update to an existing MO may be registered to the DM Server locally by a DM Server administrator or authorized user, e.g. through the use of a management user interface of the DM Server. The registration procedure in this first embodiment is similar to how current MOs are provisioned but differs in that the MOs can be provisioned dynamically during normal operations of the DM Server. Through the use of a user interface to the DM Server, a DM Server administrator or even an authorized user can upload a DDF file to the DM Server. This can be done as the DM Server is processing ongoing DM commands to and from devices. Once the DDF document is uploaded, the DDF can be activated and be put in use through the same user interface. During the activation process, a DDF checker may be run against the newly uploaded file to ensure that it has valid syntax, i.e., that it conforms to the requirements of a DDF file specified by the OMA DM protocol. If the DDF checker validates the DDF document, the DM Server sets the Status node for the new MO in the DDF MO (described above) to Activate; if the DDF check finds errors in the DDF document, the DM Server sets the Status node to Error.

Figure 8:
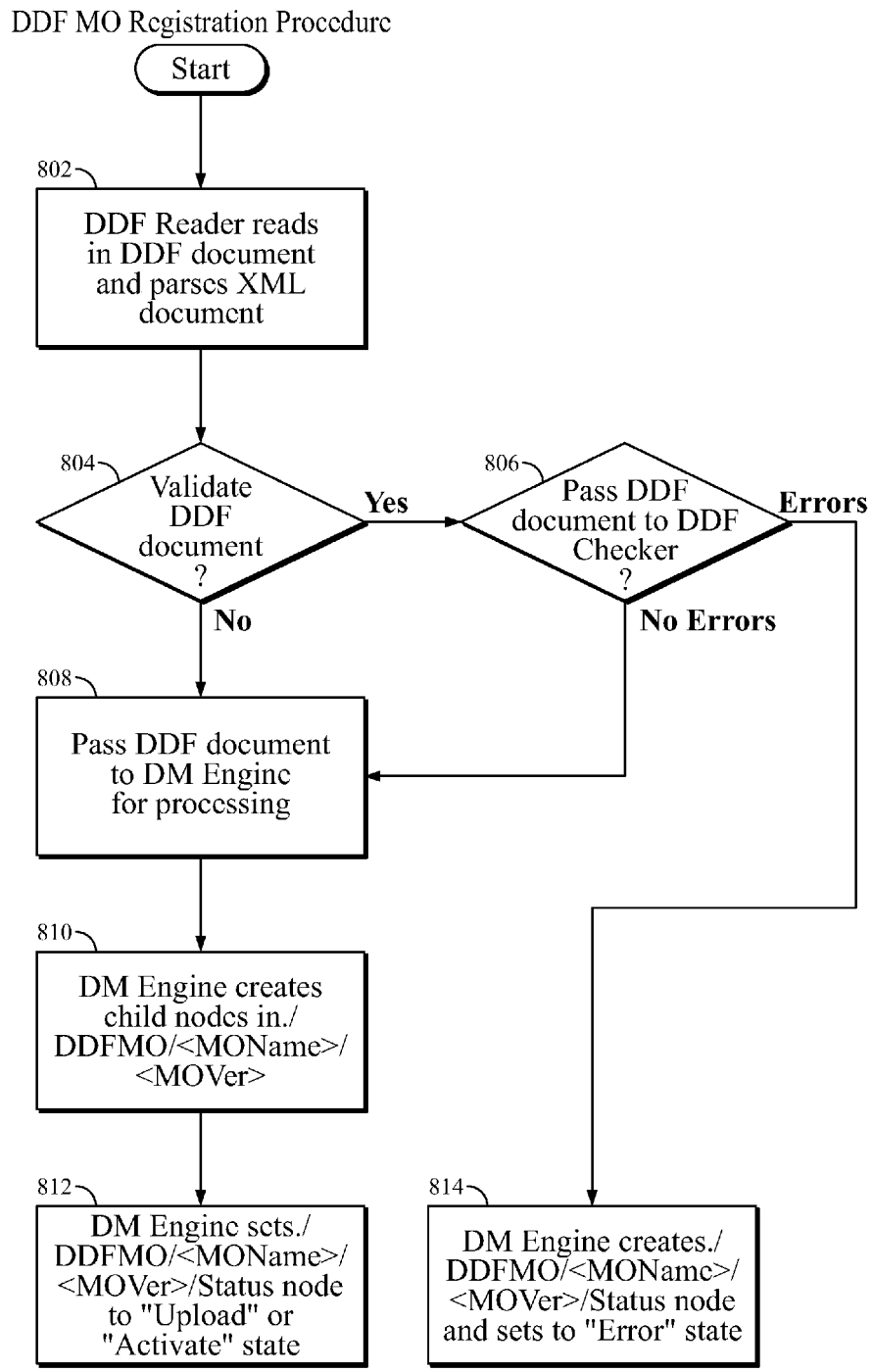
FIG. 8 is a flowchart illustrating one embodiment of the processing steps that may be triggered within a DM Server by a DDF MO registration procedure described herein.

FIG. 8 is a flowchart illustrating one embodiment of the processing steps that may be triggered within the DM Server by the DDF MO registration procedure described herein. Once the DDF file in XML format has been uploaded, the DDF document is read by a DDF Reader to parse the XML document at step 802. Then, at step 804, a decision may be made as to whether to validate the DDF document. If not, control passes to step 808 where the DDF document is passed, for processing, to a software component of the DM Server that implements the OMA DM protocol functionality (hereinafter referred to as the "DM Engine"). If validation is to be performed, then control passes to step 806, where a DDF Checker may validate whether proper DDF rules/syntax are met before sending the new DDF file to the DM Engine. For example, the DDF Checker may analyze the DDF document to ensure that its syntax and format are compliant with the requirements of the OMA DM protocol specification. If errors are detected in the format of the DDF file, then control may pass to step 814, where the DM Engine of the DM Server creates the ./DDFMO/<MOName>/<MOVer>/Status node and sets the value to the Error state. If no errors are detected in step 806 and the DDF file is validated, then control passes to step 808 and the DDF file is passed to the DM Engine.

In step 810, the DM Engine will then proceed to create the corresponding DDF MO nodes shown in FIG. 7 for the MO represented by the new DDF file. That is, the DM Engine will create in memory data structures that implement each of those nodes. After the nodes are created, in step 812, the DM Engine sets the ./DDFMO/<MOName>/<MOVer>/Status node to the Activate state.

In a second embodiment, the DDF of a new or updated MO may be registered to the DM Server through the use of a web services application programming interface (API) provided by the DM Server. This embodiment allows non-OMA DM entities to communicate their resource tree to the DM Server to provide for more seamless interworking. One example of a non-OMA DM entity that can use this mechanism is the LWM2M Server. Each LWM2M Object can be converted to a DDF file and uploaded to the DM Server through the web services API. After the DDF has been uploaded, the steps of FIG. 8 are carried out as described above.

In a third embodiment, the DDF of a new or updated MO may be registered to the DM Server dynamically from a DM Client or DM Gateway via the DM protocol using a new registration procedure. This embodiment may be implemented by the creation of a new Register DDF Alert message. Currently, DM Clients can create a DM Session to a DM Server using an Alert message with Alert Code 1201. This indicates a "Client-Initiated Management Session" request to establish a DM Session with the DM Server. In this third embodiment, an additional alert code is added which may be used to indicate that a DM Client has a new DDF file to upload. In one embodiment, the new Alert message may include the following data:

<Meta>/<Type> element: contains the media type of the alert contents. An example value may be "urn:oma:at:oma-ddfmo:registerddf:1.0".

<Meta>/<Format> element: contains the format of the alert. This value may be "chr" or "xml" depending on whether the <Source>/<LocURI> or <Item>/<Data> element is specified respectively.

<Source>/<LocURI> element: contains the URI where the DDF file can be retrieved by the DM Server. In one embodiment, this element is mutually exclusive with the <Item>/<Data> element. If one is present, the other should not be present.

<Target>/<LocURI> element: contains the target URI of the destination DM Tree where the DDF file should be stored.

<Item>/<Data> element: contains the contents of the DDF file in xml format within the <Data></Data> tags. As mentioned, in the one embodiment mentioned above, this element is mutually exclusive with the <Source>/<LocURI> element. If one is present, the other should not be present.

It is understood that the DM Server that performs the steps illustrated in FIG. 8 is a logical entity that may be implemented in the form of software (i.e., computer-executable instructions) stored in a memory of, and executing on a processor of, a network node or computer system such as the computer system illustrated in FIG. 19D (described below). And the method illustrated in FIG. 8 may be implemented in the form of software (i.e., computer-executable instructions) stored in a memory of the DM Server, which computer executable instructions, when executed by the processor of the DM Server, perform the steps illustrated in FIG. 8. It is also understood that any transmitting and receiving steps illustrated in FIG. 8 may be performed by communication circuitry (e.g., circuitry 97 of FIG. 19D) of the DM Server under control of its processor and the computer-executable instructions (e.g., software) that the processor executes.

Figure 9:
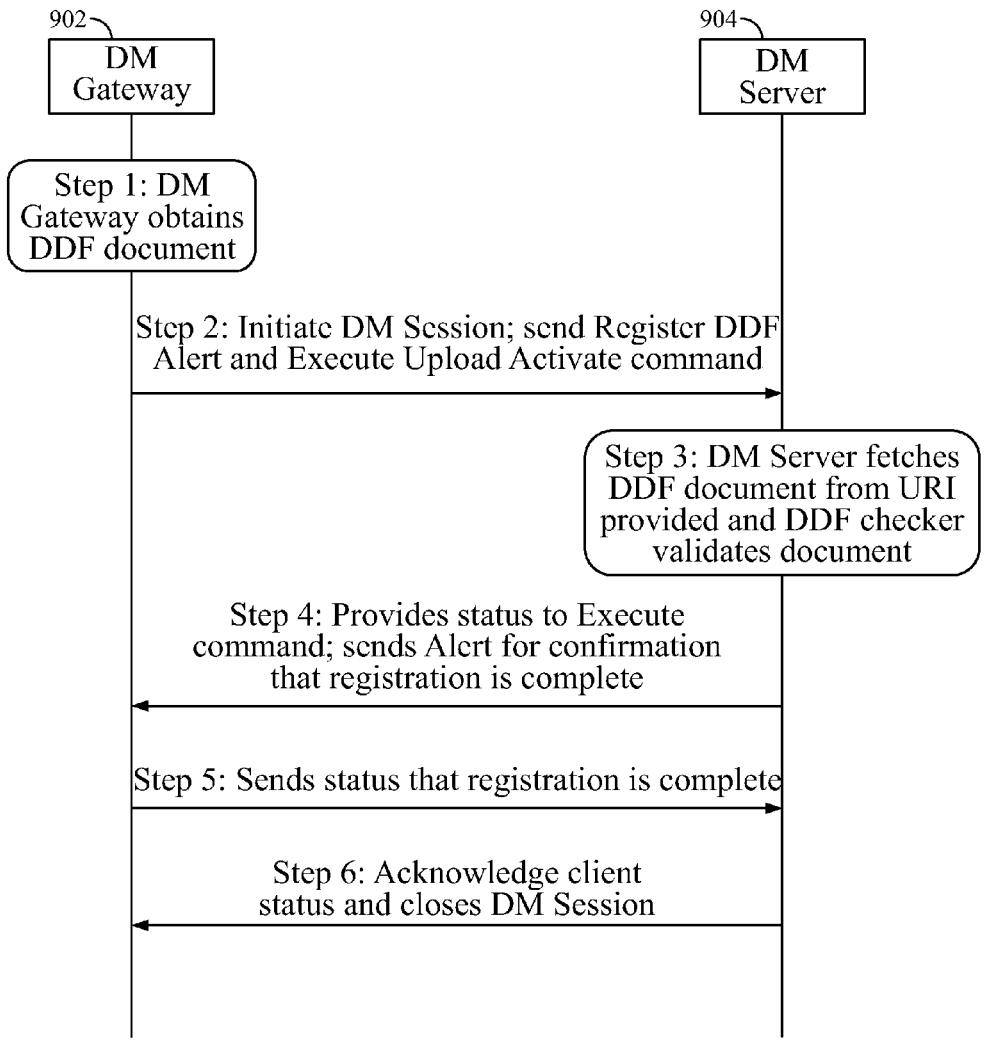
FIG. 9 is a call flow illustrating one embodiment of a method for registering a new DDF with the DDF MO.

FIG. 9 is a call flow illustrating one example of this third embodiment for registering a new DDF with the DDF MO. In this example, the steps are performed by a DM Gateway/Client 902 and a DM Server 904. Note that a DM Client can also perform the DDF MO Registration procedure to either a DM Gateway or DM Server in the same manner as outlined in this FIG. 9.

As shown, in step 1, the DM Gateway obtains the new DDF document. In step 2, the DM Gateway initiates a DM Session with the DM Server. In addition, it sends the Register DDF Alert message and an Execute command on the UploadActivate node of the DDF MO. In this embodiment, it is assumed that a URI for the location of the DDF file is provided in the Register DDF Alert message, instead of the alert message containing the text of the DDF file itself.

In step 3, the DM Server receives the Register DDF Alert message and fetches the DDF document from the URI provided. The DM Server may then validate the DDF document using a DDF checker. If the validation is successful, the DM Server may set the ./<MoName>/<MoVersion>/Status node to Activate. Then, at step 4, the DM Server may send status of the Execute command to the DM Gateway along with an Alert for confirmation that the registration procedure is complete. In step 5, the DM Gateway may send status that registration is complete. In step 6, the DM Server may acknowledge the client status and close the DM Session.

FIG. 10A shows one example of a Register DDF Alert message in which a DDF file is embedded in the message. FIG. 10B shows another example of a Register DDF Alert message in which the location of the DDF file is specified by a URI.

GwMO Device Registration Procedure 620

The OMA GwMO protocol specification defines a Device Inventory MO that provides a way for a DM Gateway to maintain a list of connected end devices to the gateway. However, there is no mechanism specified as to how end devices register to the DM Gateway. As another aspect of the present application, disclosed herein is a new Device Registration procedure 620 in which a LWM2M Server may register end devices to a DM Gateway and provide the DM Gateway with a list of MOs the device supports. In one embodiment, this Device Registration procedure may be applied to any non-OMA DM server such as a CoAP Resource Directory (RD), an ETSI M2M Server, or a oneM2M Common Services Entity (CSE). In addition, a LWM2M Server may communicate directly to a DM Server instead of a DM Gateway and provide the same functionalities as the DM Gateway.

Figure 11:
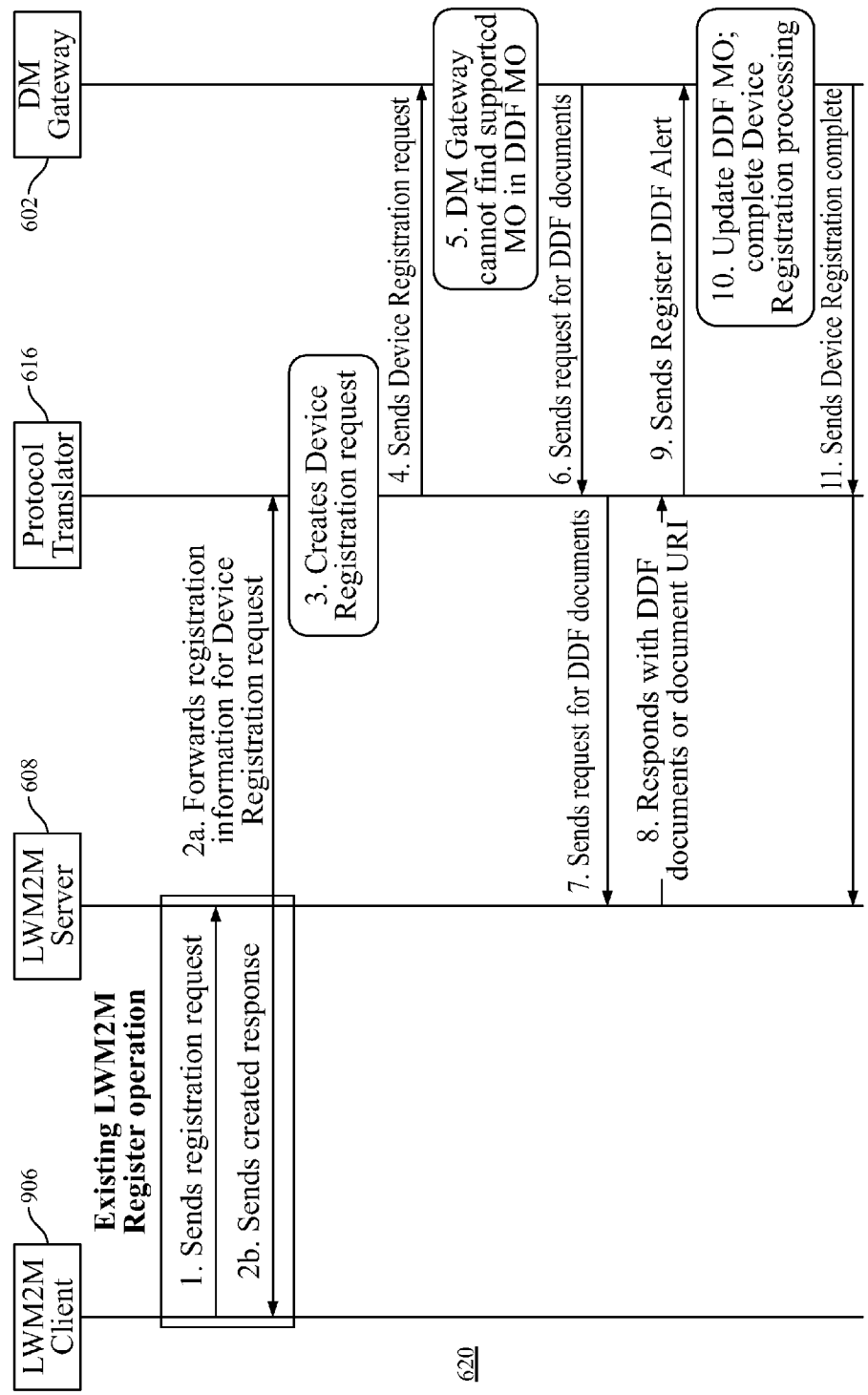
FIG. 11 is a call flow illustrating one embodiment of a new GwMO Device Registration procedure.

FIG. 11 is a call flow illustrating one embodiment of a new GwMO Device Registration procedure 620. As illustrated in FIG. 11, the entities involved in the process are an LWM2M Client 906, an LWM2M Server 608, a Protocol Translator 616, and a DM Gateway 602. The LWM2M Client, LWM2M Server, and DM Gateway entities may be implemented in the manner set forth in the respective OMA LWM2M and OMA DM protocol specifications, but modified as necessary in order to implement the new GwMO Device Registration procedure described herein. The Protocol Translator 616 is a new logical entity, which is described in further detail below. In FIG. 11, the Protocol Translator 616 is shown as a separate entity. However, in other embodiments, the Protocol Translator 616 may be integrated as part of either the LWM2M Server 608 or the DM Gateway 602.

Referring to FIG. 11, in step 1, the LWM2M Client (device) 906 registers to the LWM2M Server 608 and provides a list of LWM2M Objects the device supports. This registration step is conducted in accordance with the existing OMA LWM2M protocol specification.

In step 2b, the LWM2M Server responds with a Created message to the device and, in step 2a, forwards information about the device and its supported Objects to the Protocol Translator. In other embodiments, the LWM2M Server may also provide DDF documents during this step. If it does, then steps 6-9 described below may be omitted.

In step 3, the Protocol Translator creates a Device Registration request using the information it receives. In other embodiments in which the Protocol Translator is provisioned with DDF documents of the LWM2M Objects supported by the device, it can also send them with the Device Registration request. Again, this would remove the need to execute steps 6-9 described below.

In step 4, the Protocol Translator sends the Device Registration request to the DM Gateway.

In step 5, the DM Gateway will discover that it cannot find MOs for the LWM2M Objects supported by the device in its DDF MO. If DDF documents were provided, then control will pass directly to step 10, where for each new LWM2M Object for which a DDF document was provided—which will be treated as a new MO by the DM Gateway—the DM Gateway will create a set of nodes in its DDF MO to store the DDF document and other information for that new LWM2M Object (i.e., new MO). In this manner, the new Objects (MOs) are registered with and added to the DM Tree of the DM Gateway. However, if DDF documents have not been supplied with the Device Registration request, control proceeds to step 6.

In step 6, the DM Gateway sends a request for DDF documents to the Protocol Translator. In step 7, the Protocol Translator forwards the request to the LWM2M Server. In step 8, the LWM2M Server responds by sending back DDF documents for the LWM2M Client device's Objects (i.e., MOs) or URI's for those DDF documents.

In step 9, the Protocol Translator sends a Register DDF Alert message to the DM Gateway. In step 10, the DM Gateway updates its DDF MO as described above and completes the registration process. It also updates its Device Inventory MO. In step 11, the DM Gateway sends a Device Registration complete message through the Protocol Translator to the LWM2M Server.

Figure 12:
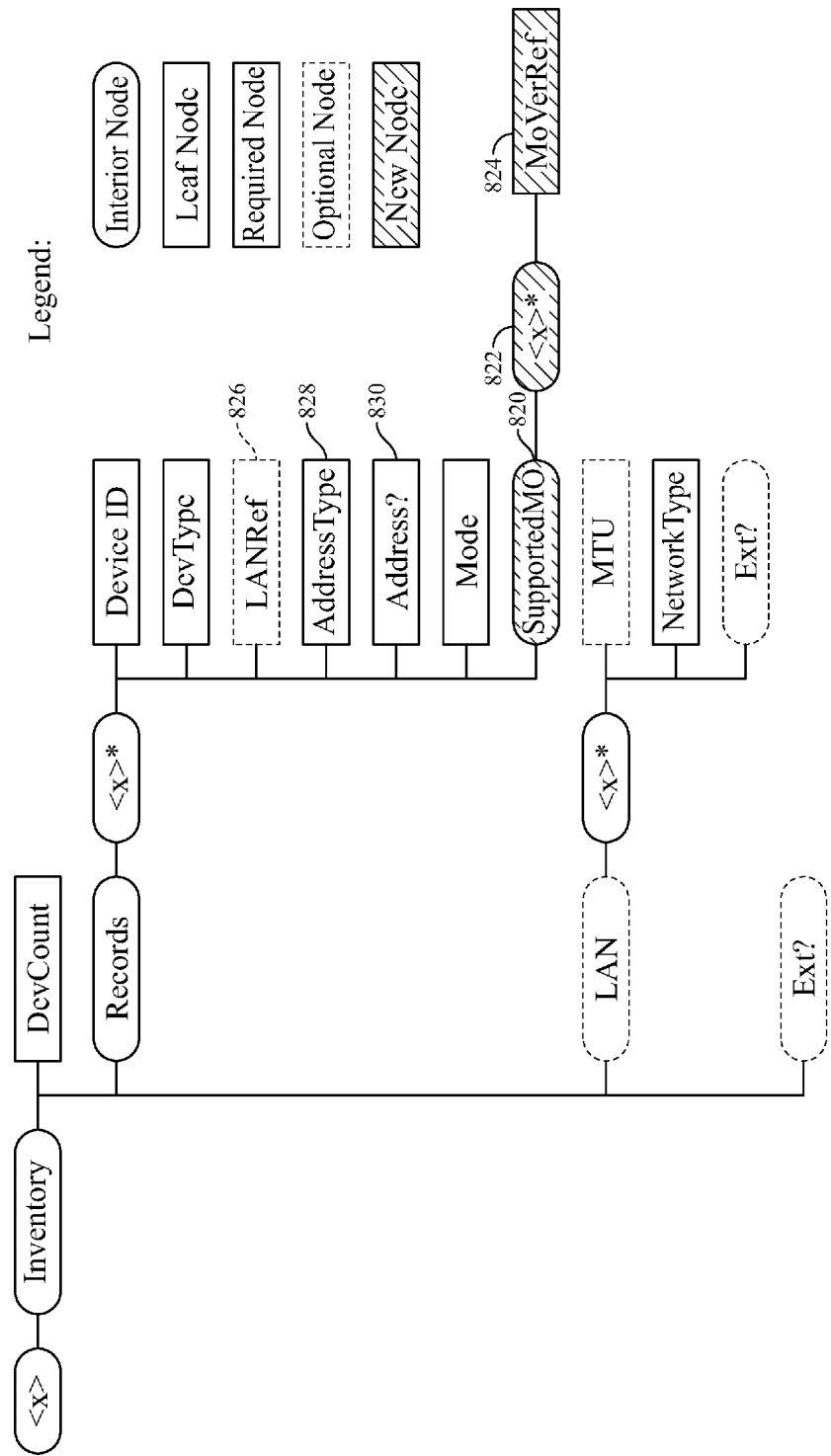
FIG. 12 is a diagram illustrating one embodiment of a structure of a Device Inventory MO—as described in the OMA GwMO protocol specification—but with the addition of a new node—SupportedMO—and its child nodes.

FIG. 12 is a diagram illustrating one embodiment of a structure of a Device Inventory MO—as described in the OMA GwMO protocol specification—but with the addition of a new node—SupportedMO 820 and its child nodes 822, 824. These new nodes may be used to keep track of the MO (e.g., LWM2M Object) that a particular device supports in a similar fashion to that of the List MOs of the OMA DM protocol specification. The inclusion of the SupportedMO node 820 within the Device Inventory MO ensures that the appropriate DDF documents are present in the DM Gateway's DDF MO. If the documents are not present, then the DM Gateway may alert the LWM2M Server or Protocol Translator to provide the DDF documents during the Device Registration procedure described above. In one embodiment, the nodes are populated by the DM Gateway after the LWM2M Server uploads and activates the DDF entries in the DDF MO.

Below are descriptions of the new nodes and their DFProperties, in accordance with one embodiment:

URI: ./<x>/Inventory/Records/<x>*/SupportedMO
This interior node 820 is the parent node for the listing of all MOs that the device supports.

| Status | Tree Occurrence | Format | Access Type |
| --- | --- | --- | --- |
| Required | One | node | Get |

URI: ./<x>/Inventory/Records/<x>*/SupportedMO/<x>*
This placeholder node 822 provides the name of the MOs that the device supports.

| Status | Tree Occurrence | Format | Access Type |
| --- | --- | --- | --- |
| Required | Zero or More | node | Get, Add, Replace, Delete |

URI: ./<x>/Inventory/Records/<x>*/SupportedMO/<x>*/MoVerRef
The value of this leaf node 824 provides the node name of the URI within the DM Tree that point to the version of the DDF that the device supports. The value must match with that of a registered DDF file in the DDF MO, e.g. ./DDFMO/<MoName>/<MoVersion>. If it doesn't, then the DM Gateway needs to request the DDF documents from the LWM2M Server or Protocol Translator during the Device Registration procedure.

| Status | Tree Occurrence | Format | Access Type |
|---|---|---|---|
| Required | One | Chr | Get |

In one embodiment, the Device Registration procedure illustrated in FIG. 11 may be implemented by a new DM Command, referred to herein as the Register command. In an embodiment, the Register command combines the property requirements of both the Atomic and Sequence commands of the OMA Device Management Representation Protocol, Version 1.2.1, which means that the DM Gateway is required to process all the subordinate commands within the Register command in the sequence that they are specified and in an all or nothing fashion. These requirements may be important to ensure that all information about the devices is correctly entered into the DM Gateway. Preferably, the devices involved have been provisioned with credentials to properly communicate with the DM Gateway, whether it is factory bootstrapped or dynamically bootstrapped.

In one embodiment, the following information may be specified in the Register command:

1. Target path where the Device Inventory record is created, e.g. ./<x>/inventory/Records/<x> where <x> is specified. In one embodiment, this Item is required in the registration message.
2. Device ID field—in one embodiment, this field should be specified if the device has a devID found in the DevInfo MO. If the device does not have such a node, then the Register message may not include this field—the DM Gateway may assign a value when this field is not specified. The DeviceID node of the Device Inventory MO of FIG. 12 will be populated with this value, if it is provided as part of the Device Registration procedure.
3. Device Type field—specifies the device type found in the DevType node of the DevDetail MO. In one embodiment, for non-OMA DM devices, a value such as "M2M Device" may be specified. In one embodiment, this Item is required in the registration message. The DevType node of the Device Inventory MO of FIG. 12 will be populated with this value, if it is provided as part of the Device Registration procedure.
4. Operational Mode—if the device is provisioned with knowledge of which GwMO modes of operations it can operate in, then it may specify the value for this field. If the device is non-OMA DM compliant, then in one embodiment, this field may be set to 4, which specifies Adaptation mode is used. The Mode node of the Device Inventory MO of FIG. 12 will be populated with this value, if it is provided as part of the Device Registration procedure.

Upon receiving the Register command, the DM Gateway may create the specified nodes found in the subordinate Add commands of the Device Registration message (e.g., the example subordinate Add commands of FIG. 13A) and if successful, it will supply the network connectivity nodes LANRef 826, Address Type 828, and Address 830 of the Device Inventory MO. This information is known to the DM Gateway. That is, the DM Gateway provides (potentially) various network connections (wife, Bluetooth, etc.) to which devices can connect. These connect options are known by the DM Gateway when it is deployed. One entry exists for each connectivity option under the ./<x>/Inventory/LAN node of the Device Inventory MO tree (see FIG. 12).

FIG. 13A shows one example of a Device Registration message. During the device registration procedure, either the LWM2M Server or the Protocol Translator may upload DDFs using the DDF MO Registration procedure if the supported MO is not found in the DM Gateway's DDF MO. Once the Device Registration procedure is complete, the DM Gateway sends a Device Attach Alert to the DM Server to inform it that a new device has registered to the DM Gateway and it can now be managed.

When a device de-registers itself from the LWM2M Server, a Device De-Registration procedure may be executed to inform the DM Gateway that the device is no longer available. The same Register command may be sent but with a Delete command inside instead of the Add commands. This deletes the Records entry that was created by the initial Device Registration procedure. The DM Gateway in turn may remove the specified nodes from the Device Inventory MO and sends the DM Server a Device Detach Alert to inform the server that the device is no longer available to be managed. One example of a de-registration message is shown in FIG. 13B.

Protocol Translation Interworking

The Protocol Translation function disclosed herein may be used to translate OMA DM protocol to LWM2M protocol and vice versa. In various embodiments, it may be implemented in one of three different ways: 1) internally within the LWM2M Server, 2) externally in a separate entity that receives all messages from the LWM2M Server, or 3) as a component of the DM Gateway. In the case of the first implementation, a DM Client may be integrated to the LWM2M Server and it may be updated to support the new registration procedures for DDF MO Registration and Device Registration described above. For the second implementation, the LWM2M Server may send the external protocol translation interworking entity all messages it receives and let that entity perform the translations proposed in this section. For the third implementation, the DM Gateway may support receiving LWM2M messages and also be updated to support the new registration procedures for DDF MO Registration and Device Registration.

TABLE 1

| Protocol Translation from OMA DM to LWM2M | |
|---|---|
| OMA DM Commands | LWM2M Operations |
| Add | Create |
| Atomic | See below for translation description |
| Copy | Read, Create |
| Delete | Delete |
| Execute | Execute |
| Get | Read |
| Register (new command) | Register |
| Replace | Write or Update |
| Sequence | See below for translation description |

| Protocol Translation from LWM2M to OMA DM | |
|---|---|
| LWM2M Operations | OMA DM Commands |
| Register | Register (with Add commands) |
| Update (wrt registration) | Replace |
| De-Register | Register (with Delete command) |
| Read | Get |
| Discover | Get |
| Write | Replace |
| Write Attributes | Replace |
| Execute | Execute |
| Create | Add |
| Delete | Delete |

TABLE 1-continued

| Observe | Get (with ext node) |
| Notify | Alert |
| Cancel Observation | Delete (after Alert message) |

Table 1 describes the protocol translation between the OMA DM commands and the LWM2M operations and from LWM2M operations to OMA DM commands, in accordance with one embodiment of the Protocol Translator disclosed herein (e.g., the Protocol Translator illustrated in FIG. 11). This translation may be performed by the Protocol Translator depending on who the requestor is. As noted in Table 1, the manner in which the Protocol Translator handles translation of the Atomic and Sequence DM commands is described more fully below.

By way of additional background, the OMA DM Protocol operates on top of HTTP/TCP and hence depends on the TCP Protocol for maintaining session-oriented communications between the server and client. OMA LWM2M, on the other hand, operates on top of CoAP/UDP and as a result, it needs to utilize CoAP's confirmable and retransmission mechanisms to get acknowledgements from the recipients. This is especially important with servicing the Atomic and Sequence DM Commands in which a group of DM commands is specified to be processed together.

As mentioned earlier, a DM Session is created between the DM Server and a DM Client in OMA DM Protocol to transmit DM Commands between the two entities. This management session is created within the context of the TCP Protocol, which is a connection-oriented protocol that offers reliable and ordered communications between the two endpoints. OMA LWM2M uses a lighter weight transport layer protocol called UDP, which is a connection-less protocol that offers low-overhead and reduced latencies suitable for constrained devices. As a result, a mechanism to bridge the gap between a connection-oriented protocol to a connection-less protocol, and vice versa, is needed when interworking LWM2M and OMA DM.

In OMA DM Protocol, commands can be transmitted either as a single command or grouped together within an Atomic or Sequence command. Each command has an associated command ID (CmdID) to differentiate it from other commands. In one embodiment, this CmdID may be used as the CoAP Token for the translation from OMA DM to LWM2M when a single command is sent. For Atomic and Sequence commands, there may be a CmdID for the group of commands and a separate CmdID for each command within the group. FIG. 14 shows an example of a Sequence command that contains two Add and one Delete commands. The Sequence command has a CmdID and each of the Add and Delete commands has its own CmdID. The structure of an Atomic command is similar to that of the Sequence command with multiple CmdIDs. For these cases, in one embodiment, the CmdIDs of the commands within either the Atomic or Sequence commands may be mapped to CoAP Message IDs while the CmdID of the Atomic or Sequence command may be mapped to the Token.

In addition to mapping CmdIDs to CoAP Tokens and Message IDs, the Protocol Translator of the present application accounts for the requirements of both the Atomic and Sequence commands. For Atomic commands, the requirement is that all subordinate commands be executed as a set and succeed or fail as a unit. If this requirement is not met, then all subordinate commands that were executed need to be rolled back to their previous state. As a result, the Protocol Translation function disclosed herein keeps track of the state of the affected nodes before and after execution of all subordinate commands. If any subordinate command fails within the Atomic command, the Protocol Translator must undo all previously executed subordinate commands. Consequently, in one embodiment, the Protocol Translator first retrieves the state of a node and saves it before executing a subordinate command.

The Sequence command also offers the ability to group commands together but it differs in that the only requirement is that commands be executed in the order specified. The subordinate commands within an Atomic command are not guaranteed to be executed in order. In this case, in one embodiment, the Protocol Translator keeps track of the execution sequence of the subordinate commands.

For Information Reporting cases in which a LWM2M Server has data collected from devices for a DM Server, the LWM2M Server may send a Generic Alert targeting a URI of the LWM2M Object with the data collected from the device to the DM Gateway, which will then relay the message to the DM Server. Alternatively, in another embodiment, Alert nodes may be added to the LWM2M Object's DDF file on which the LWM2M Server may then execute ordinary OMA DM commands.

Figure 15A:
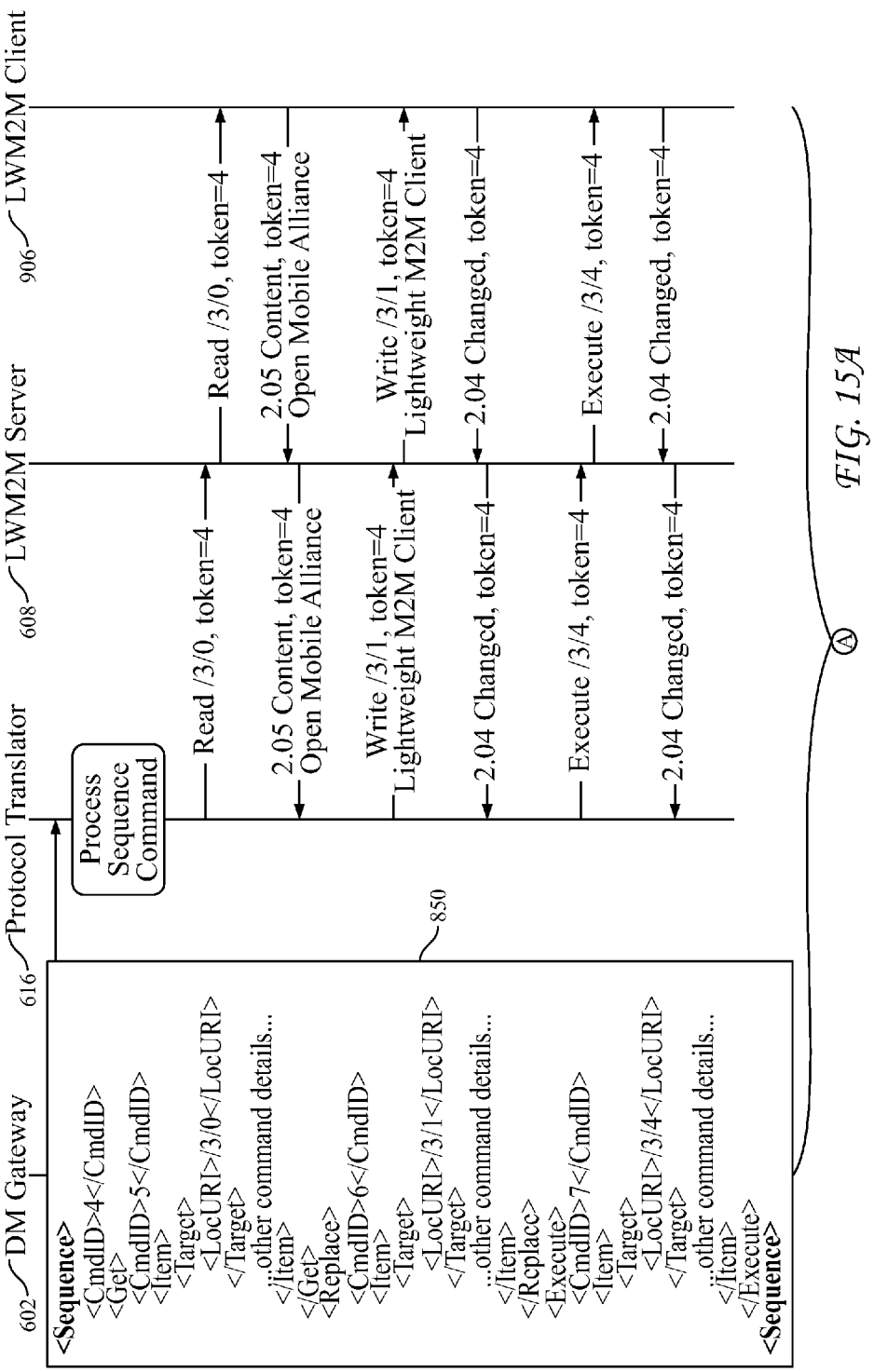
FIGS. 15A and 15B together comprise a call flow illustrating one example of the protocol translation that may be performed by a Protocol Translator, in accordance with one embodiment thereof.
Figure 15B:
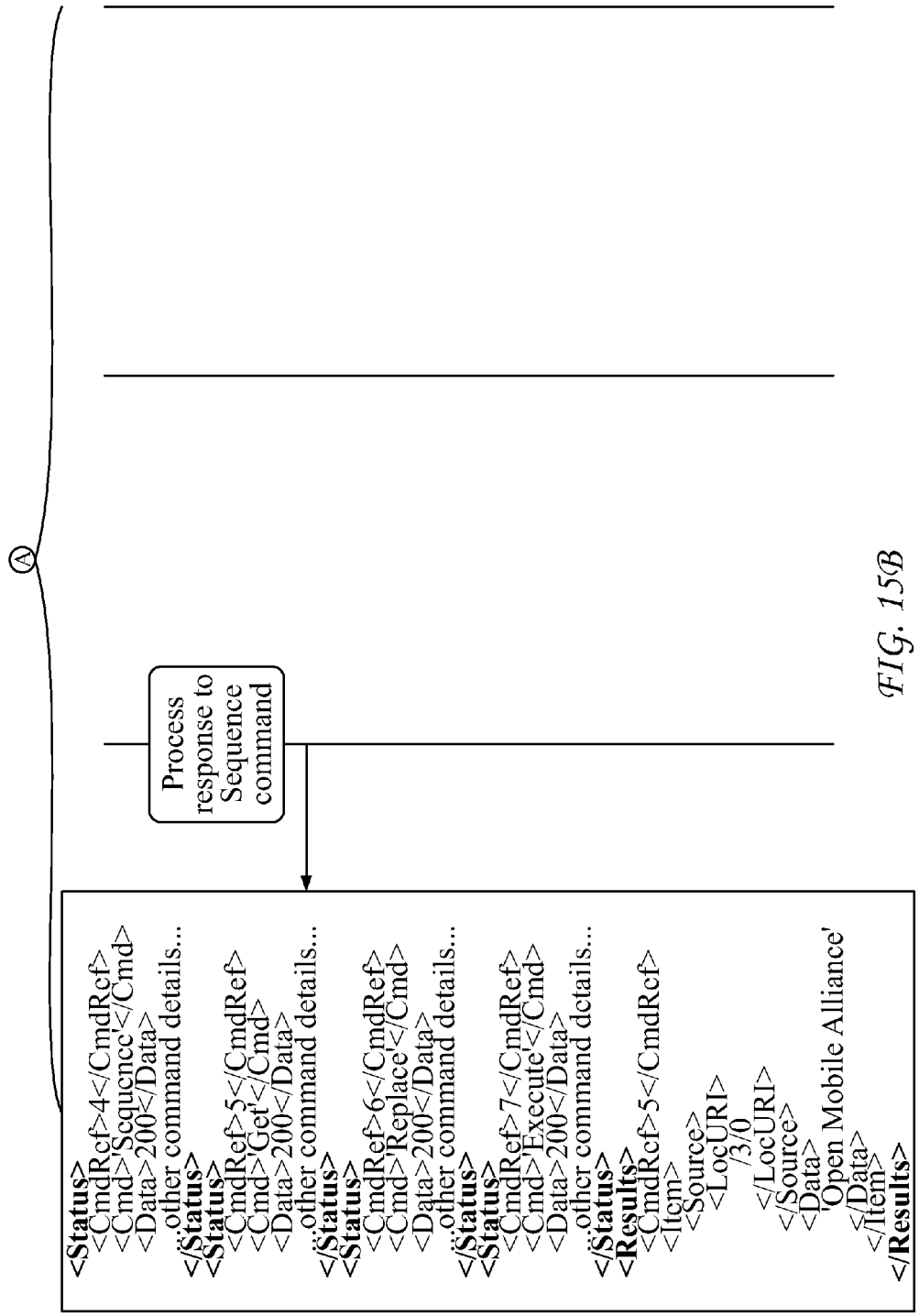

FIGS. 15A and 15B together comprise a call flow illustrating one example of the protocol translation that may be performed by the Protocol Translator 616 disclosed herein for the DM Sequence command, which is shown in the first text box 850 associated with the DM Gateway 602. Note that in this example, the Protocol Translator 616 and the LWM2M Server 608 are shown as two separate entities in the figure. However, in other embodiments, they may co-exist as one entity.

The subordinate commands Get, Replace, and Execute are processed in order by the Protocol Translator and translated to the Read, Write, and Execute operations respectively. As shown, the token used for the LWM2M operations all point to the CmdID of the Sequence command and not the individual subordinate commands. The URIs shown corresponds to the LWM2M Device Object with prefix "/3", per the LWM2M Technical Specification, candidate version 1.0 of the OMA. The details of the translation are as follows.

The Sequence CmdID is mapped to the CoAP token used between the Protocol Translator and the LWM2M Server 608. It is also used between the LWM2M Server 608 and the LWM2M Client 906.

The Get /3/0 subordinate command is mapped to the Read /3/0 operation, which performs a read of the/Device/Manufacturer (/3/0) resource on the device.

The value "Open Mobile Alliance" is returned for the /3/0 resource.

The Replace /3/1 subordinate command is mapped to the Write /3/1 operation, which performs a write to the /Device/Model Number (/3/1) resource on the device.

The value "Lightweight M2M Client" is written into the /3/1 resource.

The Execute /3/4 subordinate command is mapped to the Execute /3/4 operation, which performs a reboot of the device.

After the device returns the "2.04 Changed" response to the Execute operation, the Protocol Translator processes a Status response to the DM Gateway.

The status to each DM command is first given and the result to the Get operation follows in the response to the DM Gateway.

Interworking OMA LWM2M to OMA DM Using GwMO

With the growing market of M2M/IoT devices, having a mechanism to manage them becomes even more important as the devices are typically deployed in hard to reach locations such as buildings, bridges, traffic lights, etc. OMA DM service providers can provide the backbone infrastructure of the DM Server and DM Gateway and provide their services to M2M/IoT service providers, who then provide and operate the M2M devices.

Figure 16:
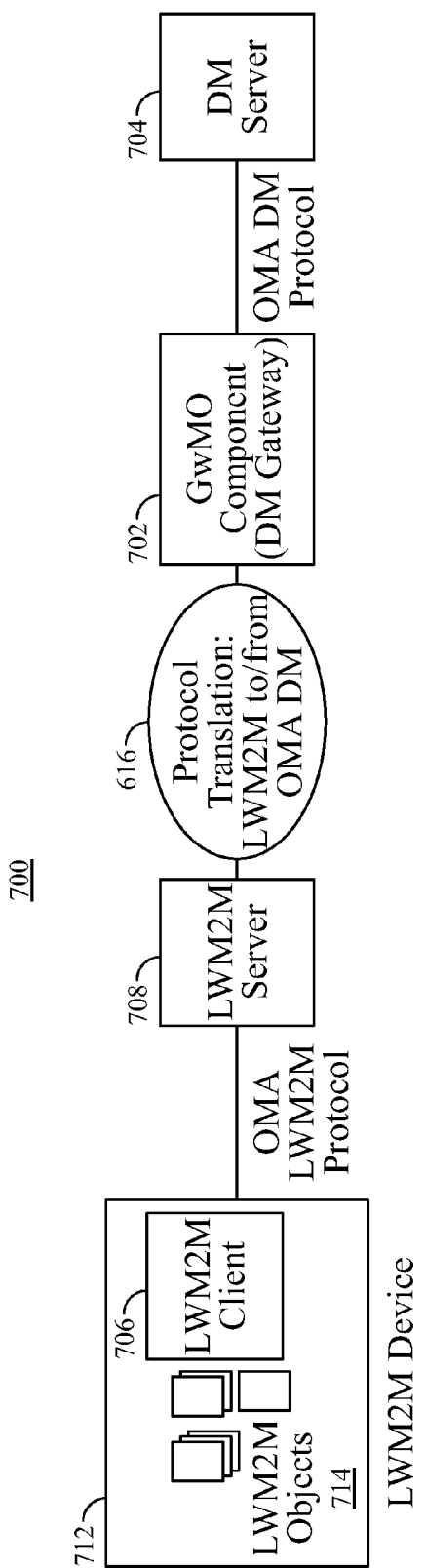
FIG. 16 shows an embodiment of a system that provides interworking between an LWM2M system and an OMA DM system through the use of the OMA GwMO Adaptation mode of operation.

FIG. 16 shows an embodiment of a system 700 that provides interworking between an LWM2M system and an OMA DM system through the use of the OMA GwMO Adaptation mode of operation. In this embodiment, the LWM2M system comprises a LWM2M Device 712, which includes LWM2M Objects 714, an LWM2M Client 706, and a LWM2M Server 708. The OMA DM system comprises a GwMO Component (DM Gateway) 702 and a DM Server 704. As discussed above in other embodiments, both the DM Gateway 702 and DM Server 704 host a DDF MO—i.e., DDF MO 612 as described herein—as part of its DM Tree to allow for registering new MOs. LWM2M Objects 714 are converted to DDF format and provided to the DM Gateway 702 using one of the embodiments of the proposed DDF MO Registration procedure described above. The conversion of LWM2M Objects to DDF format may be done out of band, for example, by a standards body or by a vendor. One way to perform such a conversion is to map the LWM2M Objects, one-for-one, to OMA DM MOs and accounting for data type conversions.

The DM Gateway 702 in turn will use the new DDF MO registration procedure 614 described above to notify the DM Server 704 of the new DDFs describing the LWM2M Objects 714. These procedures allow both the DM Gateway 702 and DM Server 704 to recognize the LWM2M Objects within their respective DM Trees and support actions on them.

Once the LWM2M Objects 714 are added to the DDF MO, the LWM2M Server 708 may provide device information in its database to the DM Gateway 702 using the new GwMO Device Registration procedure 620 described above. The DM Gateway 702 will then alert the DM Server 704 of the new devices using the Device Attach Alert message of the OMA GwMO protocol specification. At this point, the DM Server 704 will have all the information about the devices and can perform device management using the OMA DM protocol. For Information Reporting cases, the device will report its measurement to the LWM2M Server 708, which then forwards the messages to the DM Gateway 702 through the Protocol Translator 616. The DM Gateway 702 may send the device measurement in a Generic Alert message of the OMA DM protocol to the DM Server 704.

Figure 17A:
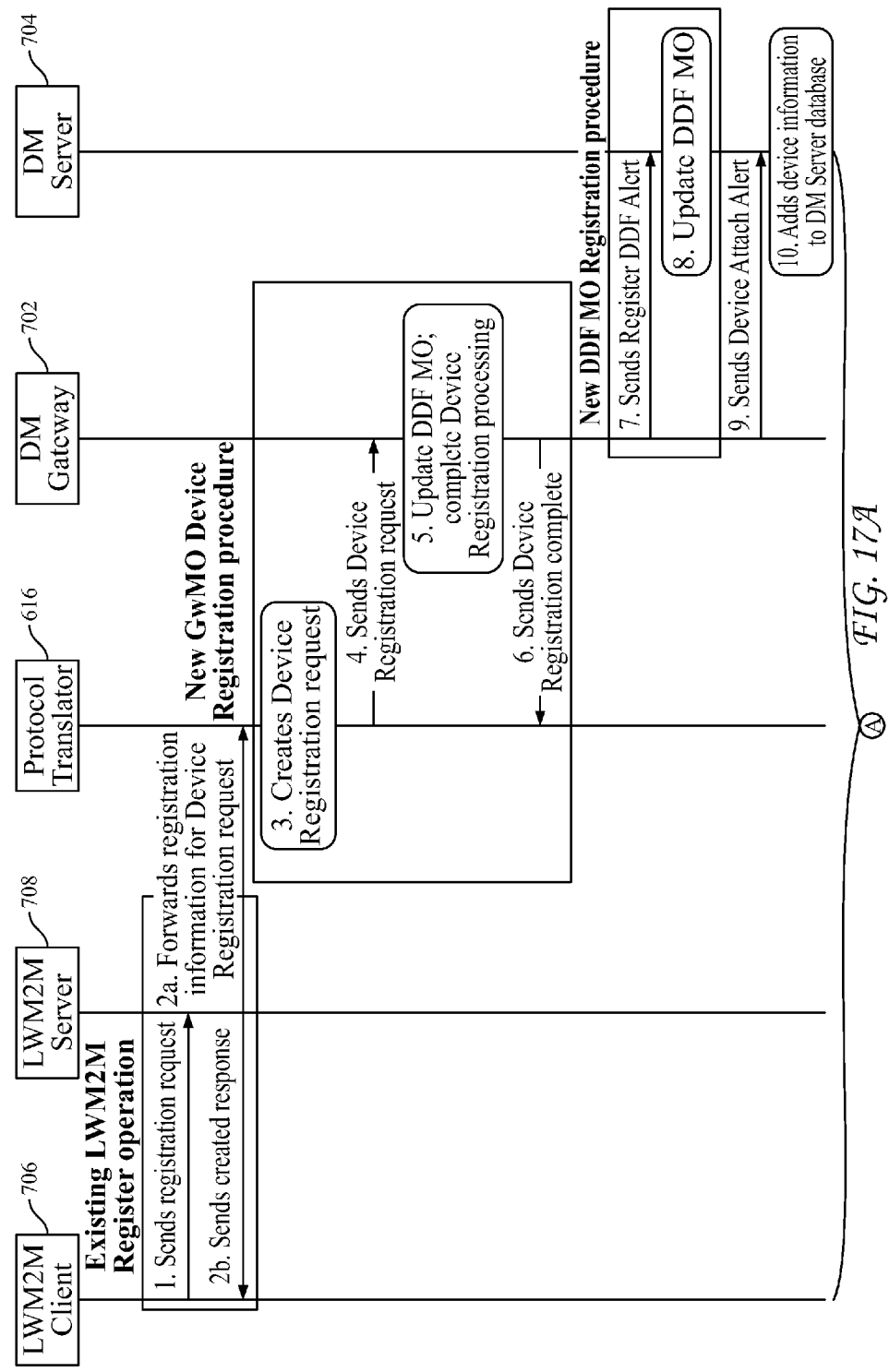
FIGS. 17A, 17B, and 17C comprise a call flow illustrating the operation of the system of FIG. 16, in accordance with one embodiment.
Figure 17B:
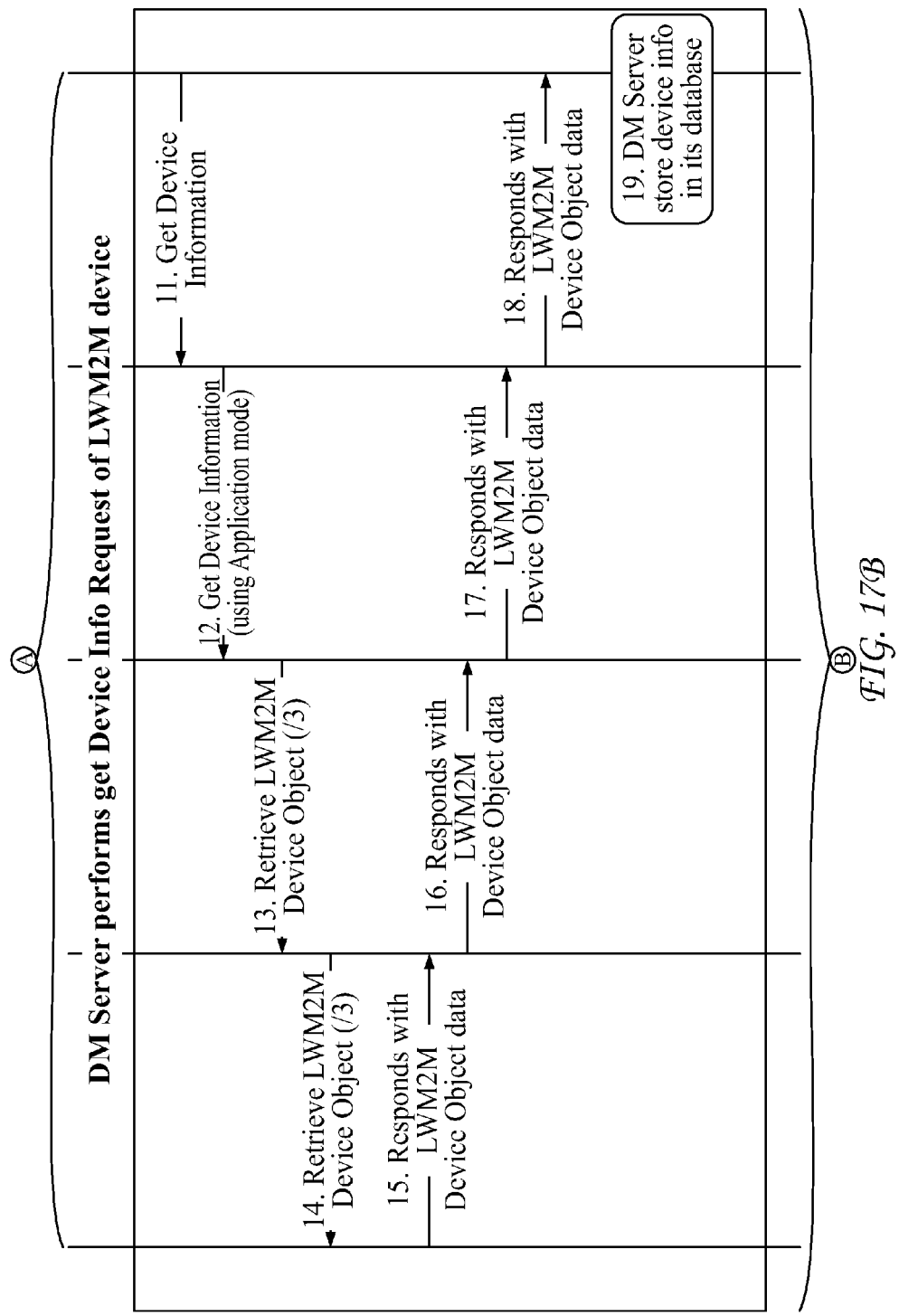
Figure 17C:
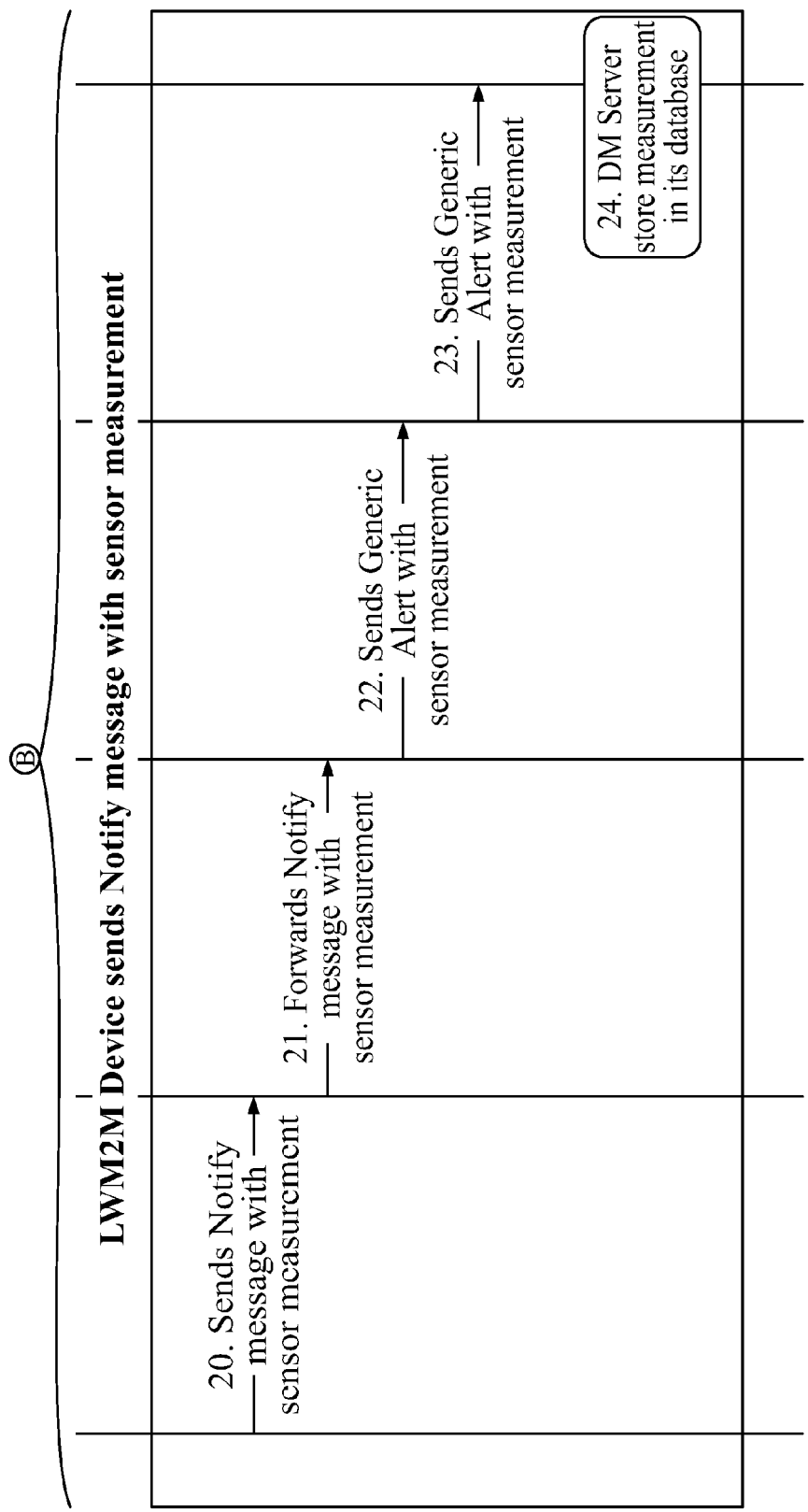

FIGS. 17A, 17B, and 17C comprise a call flow illustrating the foregoing process in greater detail, in accordance with the embodiment illustrated in FIG. 16. As shown in FIG. 17A, in steps 1-2, the LWM2M Client 706 running on device 712 registers to the LWM2M Server 708 in accordance with the OMA LWM2M protocol specification. In steps 3-6, the new GwMO Device Registration procedure 620, described in greater detail above, is performed. In steps 7-8, the new DDF MO Registration procedure 614, described in greater detail above, is performed. In steps 9-10, the DM Gateway 702 sends a Device Attach Alert to the DM Server 704.

Referring now to FIG. 17B, in steps 11-19, the DM Server 704 performs a Get DevInfo request. Steps 11 and 18 are performed in accordance with the OMA DM protocol, steps 14-15 are performed in accordance with the LWM2M protocol, and remaining steps are performed in accordance with the interworking procedures described herein.

Lastly, referring to FIG. 17C, in steps 20-24, the LWM2M Client 706 sends a Notify message with sensor measurements to the DM Server 704. Step 20 is performed in accordance with the LWM2M protocol, steps 21-22 are performed in accordance with the interworking procedures disclosed herein, and step 23 is performed in accordance with the OMA DM protocol.

As mentioned above and also described below, the entities performing the steps illustrated in FIGS. 9, 11, 15A-B, and 17A-C are logical entities that may be implemented in the form of software (i.e., computer-executable instructions) stored in a memory of, and executing on a processor of, a computer system or server connected to a network, such as the computer system illustrated in FIG. 19D (described below). Moreover, the method(s) illustrated in FIGS. 9, 11, 15A-B, and 17A-C may be implemented in the form of software (i.e., computer-executable instructions) stored in a memory of the respective entities, which computer executable instructions, when executed by a processor of the entity (e.g., processor 91 of FIG. 19D), perform the respective steps illustrated in FIGS. 9, 11, 15A-B, and 17A-C. It is also understood that any transmitting and receiving steps illustrated in these figures may be performed by communication circuitry (e.g., circuitry 97 of FIG. 19D) of the respective entity under control of the processor of the entity and the computer-executable instructions (e.g., software) that it executes.

Example Graphical User Interface

Figure 18:
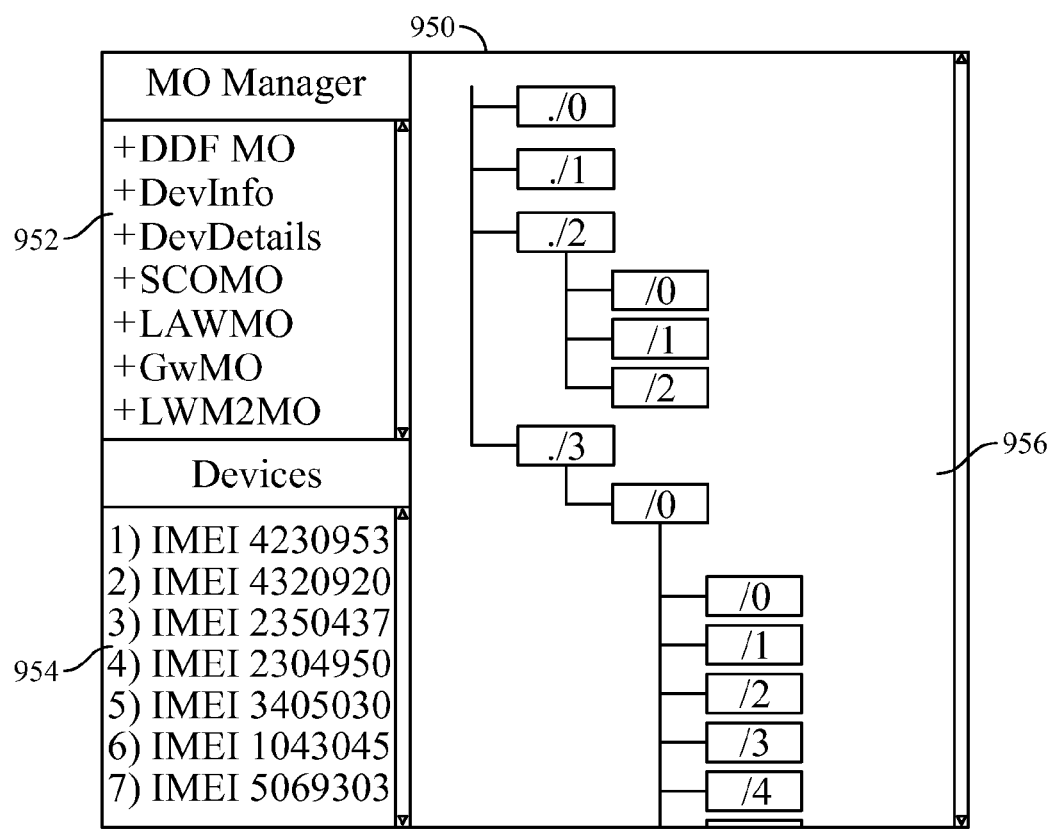
FIG. 18 shows one example of a graphical user interface that may be displayed in accordance with one embodiment thereof.

FIG. 18 shows one example of a graphical user interface 950 that may be displayed by a DM Server or DM Gateway, such as DM Server 601 or DM Gateway 602 of FIG. 6 or DM Gateway 702 or DM Server 704 of FIG. 16, in accordance with one embodiment. The graphical user interface 950 may be displayed on a display of the DM Server or DM Gateway, such as the display 86 of the computer system of FIG. 19D which may be used to implement the DM Server or DM Gateway, as described below.

As shown, the graphical user interface 950 may be used to indicate to a user (e.g., network administrator) the integration of the LWM2M protocol into the DM protocol. In the embodiment shown, the graphical user interface may include a first window 952 that displays a list of Management Objects (MO) supported by the server/gateway, which list may include both OMA DM MOs as well as LWM2M Objects, in accordance with the methods described above. The devices managed by the server/gateway may be displayed in a window 954 of the interface 950. Also in this embodiment, another window 956 may display a resource tree for a selected device (selected from the list in window 954), which device may comprise an LWM2M device in accordance with the principles disclosed herein.

Example M2M/IoT/WoT System

Figure 19A:
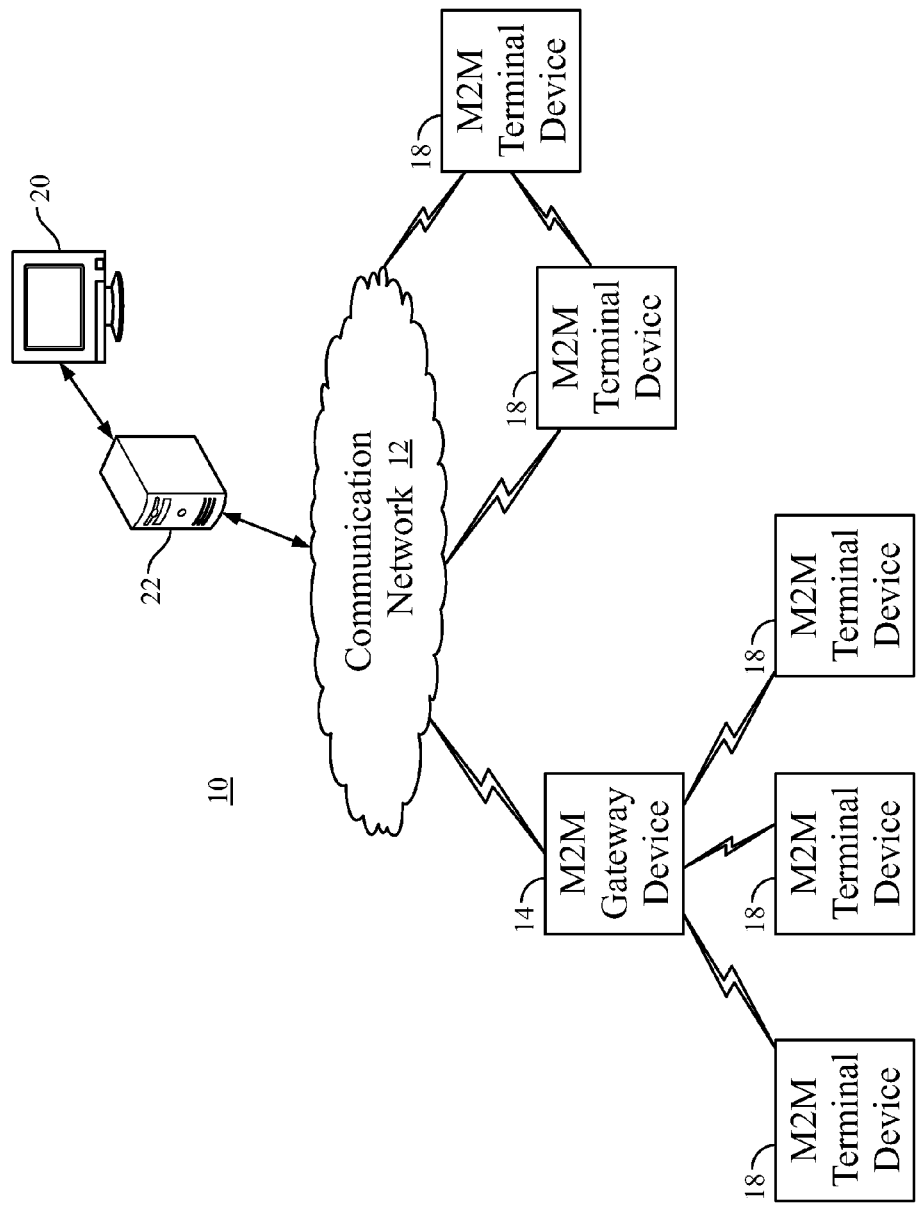
FIG. 19A is a diagram of an example machine-to machine (M2M), Internet of Things (IoT), or Web of Things (WoT) communication system in which one or more disclosed embodiments may be implemented.

FIG. 19A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, gateway or service platform may be a component of the IoT/WoT as well as an IoT/WoT service layer, etc.

As shown in FIG. 19A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 19A, the M2M/IoT/WoT communication system 10 may include an Infrastructure Domain and a Field Domain. The Infrastructure Domain refers to the network side of the end-to-end M2M deployment, and the Field Domain refers to the area networks, usually behind an M2M gateway. For example, the Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g. PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Figure 19B:
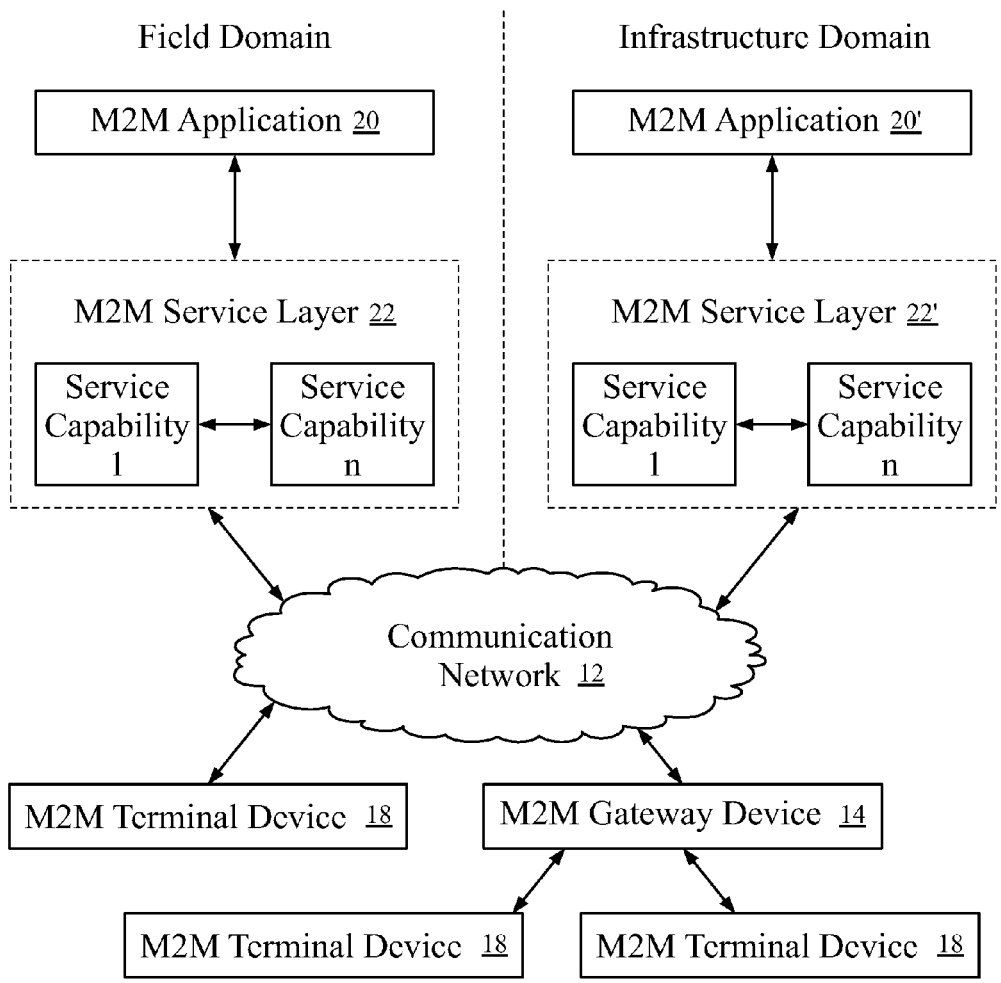
FIG. 19B is a diagram illustrating further details of the system of FIG. 19A.

Referring to FIG. 19B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications 20, M2M gateway devices 14, M2M terminal devices 18 and communication networks 12 as desired. The M2M service layer 22 may be implemented by one or more servers, computers, or the like, such as the computer system illustrated in FIG. 19D and described below. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, or the like.

Similar to the illustrated M2M service layer 22, there is an M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g. cloud/compute/storage farms, etc.) or the like.

Still referring to FIG. 19B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery, and the like. Essentially, these service capabilities free the applications of the burden of implementing these functionalities, thus simplifying application development and reducing cost and time to market. The service layer 22 and 22' also enables M2M applications 20 and 20' to communicate through various networks (such as network 12) in connection with the services that the service layer 22 and 22' provide.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node).

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

The new DDF MO 612, DDF MO Registration Procedure 614, GwMO Device Registration Procedure 620, and protocol translation function 616 can be utilized as part of a device management solution for a service layer, such as the service layers 22 and 22' illustrated in FIG. 19B, including for example the service layers defined by the ETSI M2M or oneM2M architectures. Such a service layer may initiate the DDF registration and GwMO Device registration procedures 614, 620 since the service layer would know of the M2M devices it wants to manage. The procedures and function described herein may assist in deployments where a DM Server (modified to perform the procedures described above) is part of an M2M Server and a DM Gateway (modified to perform the procedures described above) is part of an M2M Gateway.

Figure 19C:
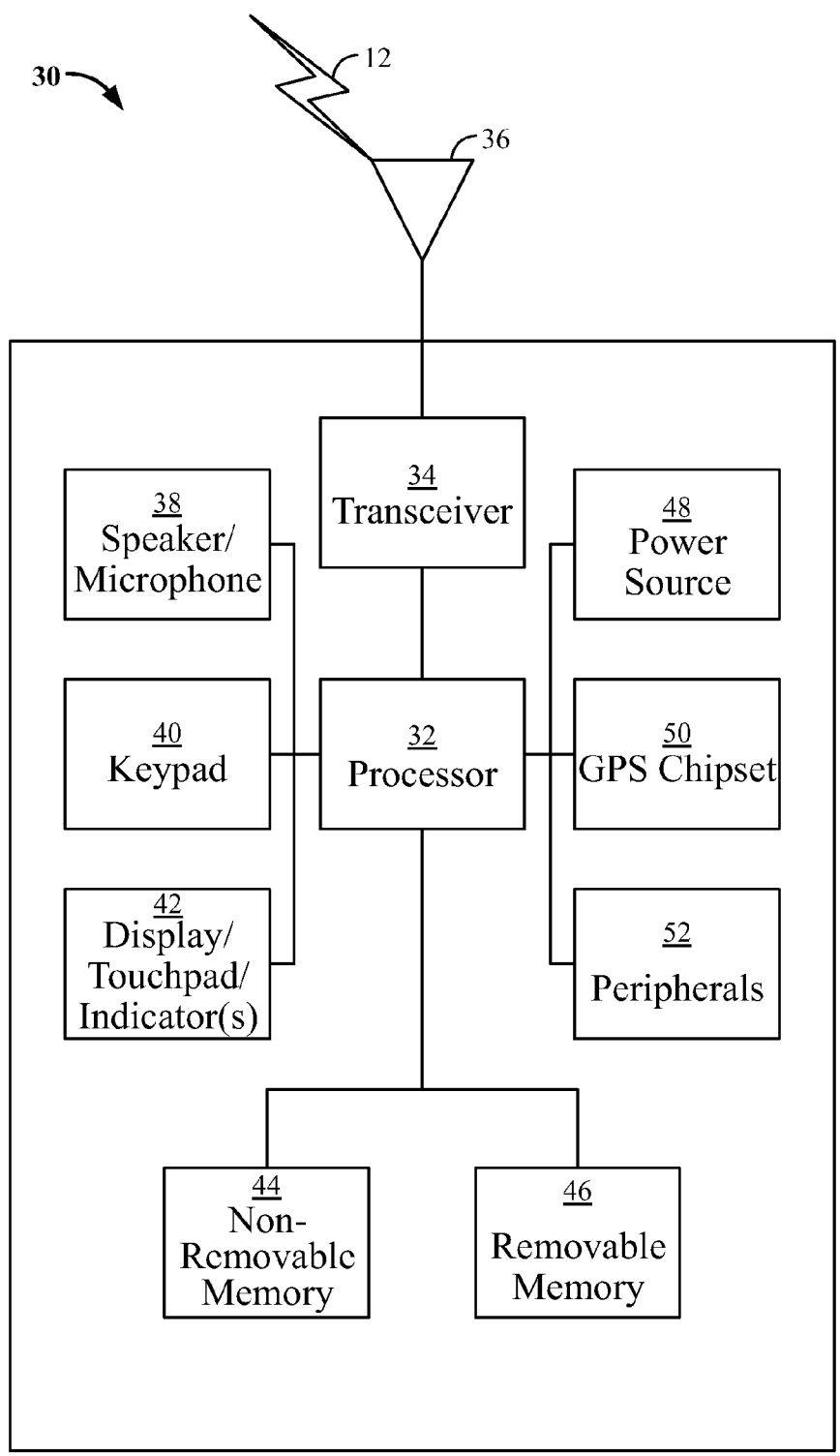
FIG. 19C is a diagram illustrating an example architecture of an end device that may be used in various embodiments.

FIG. 19C is a diagram of an example end device 30, such as end devices 604, 606, or 610*a-c* of FIG. 6, LWM2M device 712 of FIG. 16, and the M2M devices 18 and gateways 14 of FIGS. 19A and 19B. As mentioned above, an end device may comprise any wireless device capable of communicating in a wireless network, such as an M2M device, MTC device, or LWM2M device, including for example, machines, sensors, appliances, or the like, a mobile station, a fixed or mobile subscriber unit, a pager, a personal digital assistant (PDA), a computer, a mobile phone or smart phone, or any other type of device capable of operating in a wired or wireless environment. As shown in FIG. 19C, the end device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the end device 30 may include any sub-combination of the foregoing elements while remaining consistent with an embodiment.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the end device 30 to operate in a wireless environment. The processor 32 may be coupled to the transceiver 34, which may be coupled to the transmit/receive element 36. While FIG. 19C depicts the processor 32 and the transceiver 34 as separate components, it will be appreciated that the processor 32 and the transceiver 34 may be integrated together in an electronic package or chip. The processor 32 may perform application-layer programs, e.g., browsers, and/or radio access-layer (RAN) programs and/or communications. The processor 32 may perform security operations such as authentication, security key agreement, and/or cryptographic operations, such as at the access-layer and/or application layer for example. The processor 32 may execute computer-executable instructions that implement the functionality of a DM Client or LWM2M Client on the device 30.

The transmit/receive element 36 may be configured to transmit signals to, or receive signals from, another peer. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 19C as a single element, the end device 30 may include any number of transmit/receive elements 36. More specifically, the end device 30 may employ MIMO technology. Thus, in an embodiment, the end device 30 may include two or more transmit/receive elements 36, e.g., multiple antennas, for transmitting and receiving wireless signals.

The transceiver 34 may be configured to modulate the signals that are to be transmitted by the transmit/receive element 36 and to demodulate the signals that are received by the transmit/receive element 36. As noted above, the end device 30 may have multi-mode capabilities. Thus, the transceiver 34 may include multiple transceivers for enabling the end device 30 to communicate via multiple RATs, such as UTRA and IEEE 802.11 or 802.15, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the end device 30, such as on a server or a home computer.

The processor 32 may receive power from the power source 48, and may be configured to distribute and/or control the power to the other components in the end device 30. The power source 48 may be any suitable device for powering the end device 30. For example, the power source 48 may include one or more dry cell batteries, e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information, e.g., longitude and latitude, regarding the current location of the end device 30. It will be appreciated that the end device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 19D:
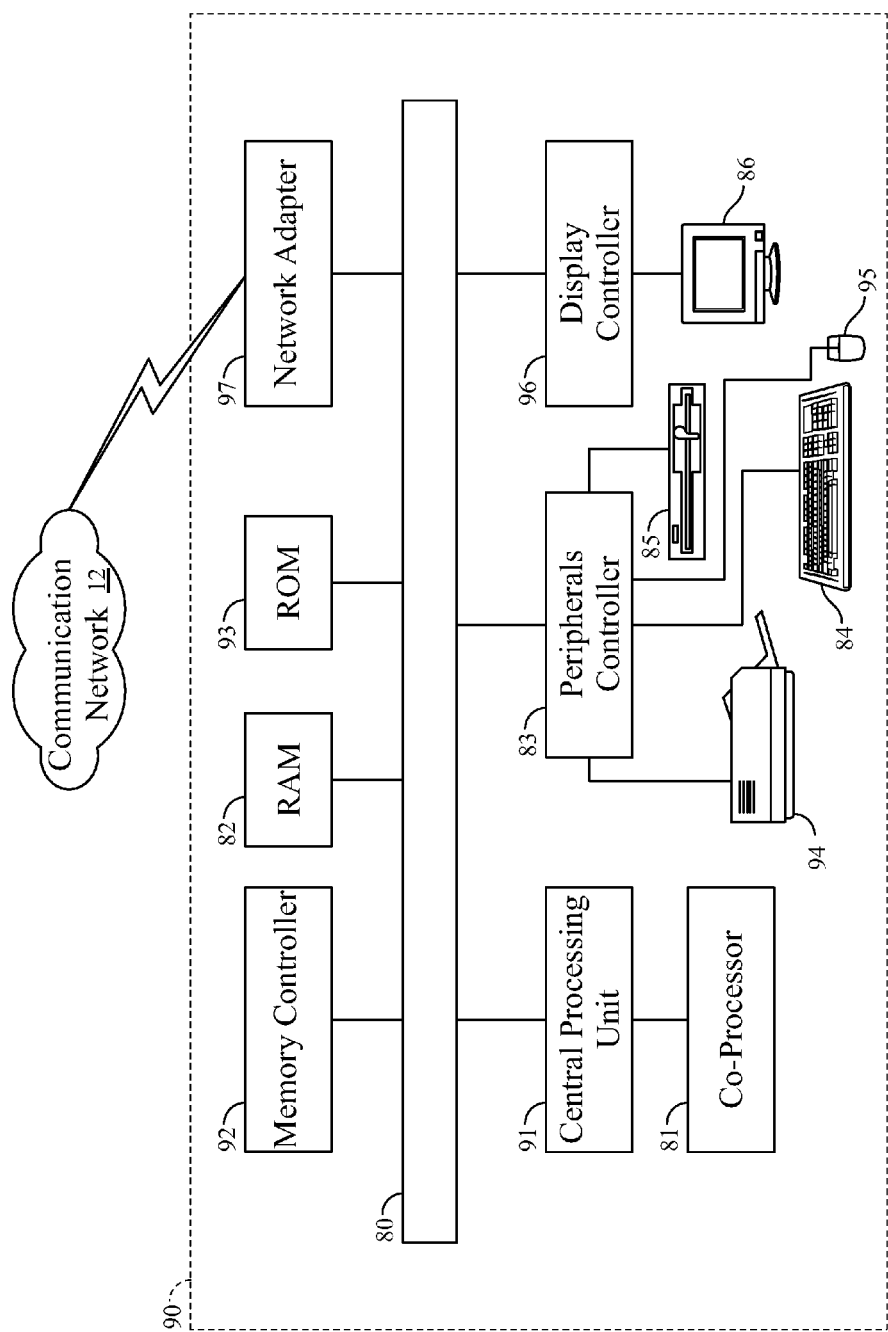
FIG. 19D is a block diagram of a computer system or server that may be used to implement any of the logical entities illustrated and described herein.

FIG. 19D is a block diagram of a computer system or server 90 that may be used to implement any of the logical entities illustrated in FIGS. 6, 9, 11, 15A-B, 16, 17A-C, of 19A-B, including for example, a DM Server, DM Gateway, LWM2M Server, Protocol Translator, M2M device, M2M gateway, M2M service layer, or the like. The computer system or server 90 of FIG. 19D may be controlled primarily by computer readable instructions, which may be in the form of software, wherever, or by whatever means such software is stored or accessed. Such computer readable instructions may be executed within a processor, such as central processing unit (CPU) 91, to cause computer system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data in connection with P2P communications.

In operation, CPU 91 fetches, decodes, and executes instructions, and transfers information to and from other resources via the computer's main data-transfer path, system bus 80. Such a system bus connects the components in end node 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computer system or server 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computer system or server 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Further, computer system or server 90 may contain network adaptor 97 that may be used to connect computer system or server 90 to an external communications network.

It is understood that any or all of the systems, methods and processes described herein, including the DDF MO Registration procedure 614, GwMO Device Registration Procedure 620, and Protocol Translation function 616, may be embodied in the form of computer executable instructions, e.g., program code, stored on a computer-readable storage medium which instructions, when executed by a machine, such as a computer, server, end device, processor, or the like, perform and/or implement the systems, methods and processes described herein. Specifically, any of the steps, operations or functions described herein may be implemented in the form of such computer executable instructions. Computer readable storage media include volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium which can be used to store the desired information and which can be accessed by a computer.

What is claimed:

1. A device management server comprising a processor and a memory, the memory storing computer-executable instruction that, when executed by the processor, cause the device management server to:
    maintain in the memory of the device management server a device description framework managed object that stores, for each of a plurality of other managed objects supported by the device management server, a copy of a device description framework document for that other managed object;
    receive a request to register a new managed object with the device management server, the request including a device description framework document for the new managed object; and
    in response to the request, add the device description framework document for the new managed object to the device description framework managed object maintained by the device management server.

2. The device management server recited in claim 1, wherein the computer-executable instructions further cause the device management server to validate a format of the device description framework document of the new managed object, prior to adding it to the device description framework managed object.

3. The device management server recited in claim 1, wherein the device description framework managed object comprises, for each of the other managed objects supported by the device management server, a set of nodes containing information about the other managed object, one of the nodes holding the copy of the device description framework document for that other managed object.

4. The device management server recited in claim 1, wherein adding the device description framework document for the new managed object to the device description framework managed object comprises:
    creating a set of nodes in the device description framework managed object for the new managed object; and
    storing the copy of the document description framework document for the new managed object in said one node of the set.

5. The device management server recited in claim 4, wherein the set of nodes for each other managed object in the device description framework managed object further includes one or more of:
    a node containing a name of the other managed object;
    a node containing an indication of a version of the other managed object;
    a node containing an object identifier (ID) that may be used to identify the other managed object;
    a node containing a name of the document description framework document for the other managed object;
    a node containing a uniform resource locator (url) associated with the document description framework document for the other managed object;
    a node containing an indication of a status of the other managed object; and
    a plurality of nodes representing operations that may be performed on the other managed object, wherein the operations comprise one or more of an upload, an upload activate, an activate, and a deactivate operation.

6. A gateway device management server comprising a processor and a memory, the memory storing computer-executable instruction that, when executed by the processor, cause the device management server to:
    maintain in the memory of the gateway device management server a device description framework managed object that stores, for each of a plurality of other managed objects supported by the gateway device management server, a copy of a device description framework document for that other managed object;

receive a request to register a new managed object with the gateway device management server, the new managed object representing an object supported by a server operating in accordance with a lightweight machine-to-machine (LWM2M) protocol;

receive a device description framework document representing the LWM2M object supported by the LWM2M server; and in response to the request, add the device description framework document for the LWM2M object supported by the LWM2M server to the device description framework managed object maintained by the gateway device management server.

7. The gateway device management server recited in claim 6, wherein the computer executable instructions further cause the gateway device management server to:

transmit a request to the LWM2M server, requesting the device description framework document for the LWM2M object from the LWM2M server; and receive the device description framework document for the LWM2M object in response to the request.

8. The gateway device management server recited in claim 6, wherein the computer executable instructions further cause the gateway device management server to:

receive, from the LWM2M server, a request to register a LWM2M object supported by the LWM2M server, the request being formed in accordance with the LWM2M protocol; and translate the request received from the LWM2M server into said request to register the new managed object with the gateway device management server.

9. The gateway device management server recited in claim 6, wherein the computer executable instructions further cause the gateway device management server to send a Register DDF Alert message to a device management (DM) server to provide the device description framework document representing the LWM2M object supported by the LWM2M server to the DM server for registration therewith.

10. A device management (DM) server comprising a processor and a memory, the memory storing computer-executable instruction that, when executed by the processor, cause the device management server to:

maintain in the memory of the DM server a device description framework managed object that stores, for each of a plurality of other managed objects supported by the DM server, a copy of a device description framework document for that other managed object;

receive a request to register a new managed object with the DM server, the new managed object representing an object supported by a server operating in accordance with a lightweight machine-to-machine (LWM2M) protocol;

receive a device description framework document representing the LWM2M object supported by the LWM2M server; and in response to the request, add the device description framework document for the LWM2M object supported by the LWM2M server to the device description framework managed object maintained by the DM server.

11. The DM server recited in claim 10, wherein the computer executable instructions further cause the DM server to:

transmit a request to the LWM2M server, requesting the device description framework document for the LWM2M object from the LWM2M server; and receive the device description framework document for the LWM2M object in response to the request.

12. The DM server recited in claim 10, wherein the computer executable instructions further cause the DM server to:

receive, from the LWM2M server, a request to register a LWM2M object supported by the LWM2M server, the request being formed in accordance with the LWM2M protocol; and translate the request received from the LWM2M server into said request to register the new managed object with the DM server.

* * * * *